US008589879B2

(12) United States Patent
Suzuki et al.

(10) Patent No.: US 8,589,879 B2
(45) Date of Patent: Nov. 19, 2013

(54) DEBUGGING SYSTEM, DEBUGGING METHOD, AND PROGRAM

(75) Inventors: Noriaki Suzuki, Tokyo (JP); Junji Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 1290 days.

(21) Appl. No.: 11/921,437

(22) PCT Filed: May 8, 2006

(86) PCT No.: PCT/JP2006/309230
§ 371 (c)(1),
(2), (4) Date: Dec. 3, 2007

(87) PCT Pub. No.: WO2006/137223
PCT Pub. Date: Dec. 28, 2006

(65) Prior Publication Data
US 2009/0235233 A1     Sep. 17, 2009

(30) Foreign Application Priority Data

Jun. 22, 2005    (JP) .................................. 2005-182032

(51) Int. Cl.
*G06F 9/44*         (2006.01)
(52) U.S. Cl.
USPC ........................................................ 717/124
(58) Field of Classification Search
USPC ........................................................ 717/124
See application file for complete search history.

(56) References Cited

U.S. PATENT DOCUMENTS

| | | | | |
|---|---|---|---|---|
| 4,807,117 A * | 2/1989 | Itoku et al. | .................... | 710/264 |
| 5,371,746 A * | 12/1994 | Yamashita et al. | ......... | 714/38.12 |
| 5,961,628 A * | 10/1999 | Nguyen et al. | .................... | 712/2 |
| 6,279,104 B1 * | 8/2001 | Sato et al. | ...................... | 712/227 |
| 6,412,106 B1 * | 6/2002 | Leask et al. | .................... | 717/124 |
| 6,505,309 B1 * | 1/2003 | Okabayashi et al. | ......... | 711/138 |
| 6,748,403 B1 * | 6/2004 | Lemke | .......................... | 709/217 |
| 6,826,717 B1 * | 11/2004 | Draper et al. | .................... | 714/39 |
| 7,690,001 B2 * | 3/2010 | Sabev | ........................... | 717/104 |
| 7,721,265 B1 * | 5/2010 | Xu et al. | ......................... | 717/127 |
| 2004/0054997 A1 | 3/2004 | Katragadda et al. | | |
| 2005/0183066 A1 * | 8/2005 | Jabori | .......................... | 717/124 |

FOREIGN PATENT DOCUMENTS

| | | |
|---|---|---|
| JP | 63-240644 | 10/1988 |
| JP | 01-092847 | 4/1989 |
| JP | 03-292540 | 12/1991 |
| JP | 04-033135 | 2/1992 |
| JP | 04-101239 | 4/1992 |
| JP | 06-168155 | 6/1994 |
| JP | 06-332747 | 12/1994 |
| JP | 07-253907 | 10/1995 |
| JP | 08-272644 | 10/1996 |
| JP | 08-3056060 | 11/1996 |
| JP | 09-244919 | 9/1997 |
| JP | 10-187486 | 7/1998 |
| JP | 11-184736 | 7/1999 |
| JP | 2003-203061 A | 7/2003 |
| JP | 2004-164113 A | 6/2004 |

* cited by examiner

*Primary Examiner* — Li B Zhen
*Assistant Examiner* — Bradford Wheaton
(74) *Attorney, Agent, or Firm* — Foley & Lardner LLP

(57) ABSTRACT

Upon receiving debugging program activation instructions sent from a communication port (1), debugging program activation instruction distribution units (61 and 71) distribute the received debugging program activation instructions to execution units designated by these activation instructions. Debugging program activation units (62 and 72) are provided for each execution unit (A and B) and, based on the activation instructions distributed by the activation instruction distribution units (61 and 71), activate debugging programs (63 and 73) on the execution units designated by these activation instructions.

12 Claims, 22 Drawing Sheets

DEBUGGING SYSTEM, DEBUGGING METHOD, AND PROGRAM

This application is the National Phase of PCT/JP2006/309230, filed May 8, 2006, which claims priority to Japanese Application No. 2005-182032, filed Jun. 22, 2005, the disclosures of which are hereby incorporated by reference in their entirety.

TECHNICAL FIELD

The present invention relates to a debugging system, a debugging method, and a program, and more particularly relates to a debugging system, a debugging method, and a program in a system having a plurality of execution units.

BACKGROUND ART

Recent years have witnessed marked growth in the scale of programs being developed, and the time required for the task of debugging is having an increasing impact on product development schedules. As a result, there is a need for the construction of an environment that would allow debugging to be carried out with greater efficiency. A method in which a diagnostic processor is used to support debugging such as the debugging system described in Patent Document 1 "Processor Information Collector and Program Recording Medium Therefor" is one method of efficiently carrying out debugging.

As shown in FIG. 1, this debugging system of the related art is provided with arithmetic processor group 801, memory device 802, and diagnostic processor 803 for monitoring the operating state of arithmetic processor group 801. Diagnostic processor 803 is further provided with: stall detector 831 for detecting the stalled state of each of the arithmetic processors that make up arithmetic processor group 801, collector 832 for collecting the internal states of the arithmetic processors, write unit 834 for saving the internal states of arithmetic processors in memory device 802, and initialization unit 836 for initializing the information processing system while holding unchanged the internal states of the arithmetic processors in memory device 802.

A debugging system of this configuration of the related art operates as described below.

Stall detector 831 first detects whether arithmetic processors that make up arithmetic processor group 801 have entered a stalled state. When a stall occurs, collector 832 collects the internal states of the arithmetic processors and writes the collected internal states of the arithmetic processors as arithmetic processor internal states 821 in memory device 802. The information processing system is then initialized with the internal states of the arithmetic processors saved unchanged in memory device 802. Because the information of the internal states of arithmetic processors has been saved in memory device 802 even after initialization, this information can be used to carry out a debugging operation regarding the state in which the stall occurred.

Although a method in which diagnostic processor 803, which is high-function dedicated hardware for debugging, is mounted in a system as in the related art described in Patent Document 1 can achieve the effect of raising the efficiency of debugging, this method also has the drawbacks of requiring the addition of hardware that does not contribute to normal operations and further, of raising the cost of the system. In addition, requirements that mean increased cost for equipments whose components are built-in are particularly severe, and this frequently prohibits the mounting of dedicated hardware.

On the other hand, the miniaturization of semiconductor integrated circuits and the greater functionality demanded of system LSI has led to an increase in the mounting of a plurality of execution units such as CPUs in system LSI. The debugging system disclosed in Patent Document 2 "Resetting Circuit and Resetting Method for Multiple CPU" is an example of the related art for increasing the efficiency of debugging while avoiding an increase in costs due to dedicated hardware for debugging.

As shown in FIG. 2, this debugging system of the related art is provided with CPU control circuit 903 for controlling the resetting and interruption of system LSI that incorporates a plurality of CPUs (CPU-A901 and CPU-B902). CPU control circuit 903 has the capability for setting one of a plurality of CPUs (CPU-A901 and CPU-B902) to a debugging means in which a program for normal operations is replaced by program for debugging. In addition, CPU control circuit 903 is further provided with: interrupt control circuit 904, bus trace function 905, strap take-in circuit 906, and debugging control circuit 907.

Explanation next regards the operation of the debugging system of the related art having this configuration with reference to FIG. 3.

First, when CPU control circuit 903 detects hardware resetting, debugging control circuit 907 issues a command for the resetting of each internal function block (not shown) (Step S91).

Strap take-in circuit 906 next reads external setting information such as strap information from strap setting unit 908 (Step S92).

When the strap information that has been read indicates normal operation ("NO" in Step S93), debugging control circuit 907 cancels the resetting for CPU-A901 and CPU-B902 and for each function block based on the strap information that has been read (Step S94).

When resetting has been canceled, each function block begins operation (Step S95).

On the other hand, when the strap information that has been read designates debugging ("YES" in Step S93), the debugging process begins (Step S96).

When the strap information selects CPU-B902 as the debugger ("B" in Step S961), debugging control circuit 907 cancels the resetting of CPU-B902 that has been selected by the strap information (Step S962).

Debugger CPU-B902 is then activated (Step S963), and upon completing the start-up operation ("YES" in Step S964), the resetting of target CPU-A901 and each functional block is canceled (Step S965).

On the other hand, when the strap information selects CPU-A901 as the debugger ("A" in Step S961), debugging control circuit 907 cancels the resetting of CPU-A901 that was selected by the strap information (Step S966).

Debugger CPU-A901 then starts up (Step S967) and upon completing the start-up operation ("YES" in Step S968), cancels the resetting of target CPU-B902 and each functional block (Step S969).

When debugging a program that is executed in a system in which a plurality of execution units perform linked operation, information that relates to communication between the plurality of execution units and that can be checked from the outside by components other than the execution units or information this is generated during the occurrence of a fault is saved and then subsequently checked. In this method, however, the cause of the occurrence of a fault cannot be adequately investigated in many cases. On the other hand, when using a program for debugging that artificially generates transmission content that is generated by a program for normal operation or by a program for debugging that reports to the debugging technician the transmission/reception content, the cause of the occurrence of a fault can usually be effectively investigated. These programs for debugging are therefore put into operation on execution units to carry out the task of debugging.

However, putting these debugging programs into operation beforehand increases the load on the CPU, and further, because the debugging programs use storage area, influences the operation timing of the normal operation program. As a result, the existence of the debugging program has the drawbacks of preventing the occurrence of faults that may occur in normal operation, and conversely, of causing the occurrence of faults that should not occur when executing only the normal operation program.

Further, in a program that is executed in a system in which a plurality of execution units perform linked operation, the execution unit in which a fault, particularly a fault produced by timing, occurs cannot be uniquely determined, and the occurrence of such a fault is therefore difficult to anticipate. When an execution unit enters a stalled state or when a fault occurs that has an effect on the operation of execution units, the debugging program may be unusable on the execution unit that is in a stalled state, or the debugging program may be unusable in execution units in which the operation is affected. As a result, the debugging program may have to be operated in a different execution unit. However, when the site of the fault occurrence cannot be uniquely determined, an execution unit that is unaffected by the fault also cannot be determined.

The method of the related art described in Patent Document 2 features the assignment of an execution unit (debugging CPU) that activates a debugging program at the time of resetting, and resetting must be carried out again when changing the debugging CPU. As a result, when a fault occurs that has an effect upon the operation of a debugging CPU that has been assigned at the time of resetting, the state cannot be debugged.

As explained hereinabove, in the above-described debugging system of the related art, the following problems arise when carrying out debugging in a system in which a plurality of execution units (CPUs) perform linked operation:

(1) When the debugging program is activated beforehand, the operation timing differs from a case in which only the normal operation program is in operation, and the presence of the debugging program therefore prevents the occurrence of faults that would occur in normal operation, or conversely, causes faults to occur that should not occur when only the normal operation program is executed.

(2) The execution unit that is to execute the debugging program must be set in advance, but the occurrence of a fault that has an influence upon the operation of the execution unit that has been set prevents debugging of the state.

Patent Document 1: JP-A-H11-184736
Patent Document 2: JP-A-2004-164113

DISCLOSURE OF THE INVENTION

The present invention was realized in view of the above-described problems and has as an object the provision of a debugging system, a debugging method, and a program that, in a system in which a plurality of execution units perform linked operation, allow a debugging program to be activated at any timing on any execution unit to carry out the task of debugging.

In order to achieve the above-described object, the debugging system of the present invention is a debugging system for carrying out debugging of a program that is executed in a system in which a plurality of execution units perform linked operation, the debugging system including:

an activation instruction distribution means for, upon receiving activation instructions instructing the activation of debugging programs, distributing the activation instructions to the plurality of execution units; and a plurality of debugging program activation means that is provided and corresponding to each of the plurality of execution units for activating debugging programs on corresponding execution units based on the activation instructions that have been distributed by the activation instruction distribution means.

The activation instruction distribution means may send the activation instructions to the debugging program activation means that corresponds to the execution unit that has been designated by the activation instruction.

According to the present invention, a debugging program activation means for activating a debugging program is provided for each execution unit, and this debugging program activation means carries out activation of the debugging program based on the activation instructions that are distributed by the activation instruction distribution means. As a result, a debugging program can be activated and the debugging operation carried out on the execution unit that is carrying out the process that was the cause of the occurrence of the fault at any timing, even when a fault has been confirmed in a state in which only the normal operation program has been placed in operation.

In addition, the activation instruction distribution means may send the activation instruction to a debugging program activation means that corresponds to an execution unit determined based on the operating states of each of the plurality of execution units.

The activation instruction distribution means may further detect the vacant capacity of storage areas used by each of the plurality of execution units and then send the activation instructions to the debugging program activation means that corresponds to an execution unit in which a surplus exists in the detected vacant capacity.

This provision can prevent the occurrence of states in which the debugging program cannot be activated due to insufficient vacant capacity.

The activation instruction distribution means may further send the activation instructions to a debugging program activation means that corresponds to an execution unit having little relation or no relation to the execution unit that. is the target of debugging.

This provision can prevent the occurrence of such problems as activating the debugging program on an execution unit that performs linked operation with the execution unit that carries out the process that caused the occurrence of a fault, thus preventing checking the cause of the occurrence of the fault.

Another debugging system of the present invention is further provided with a relay means that is provided and corresponding to any one of the plurality of execution units for relaying commands, which are transmitted from a communication port to debugging programs, to the debugging program on the execution unit designated by the activation instructions.

The present invention can be applied to a system in which execution units that are the objects of communication of communication ports are fixed.

Another debugging system of the present invention is further provided with a plurality of relay means that is provided and corresponding to each of the plurality of execution units for relaying commands, which are transmitted from communication ports to debugging programs, to the debugging programs on execution units that are designated by the activation instructions.

According to the present invention, a relay means is provided for each execution unit for relaying commands that are transmitted to the debugging program, whereby, even when a particular execution unit has entered a stalled state, a plurality of debugging programs can be simultaneously activated in a plurality of execution units while dispensing with the need for complicated switching of the execution unit that is the object of communication of a communication port.

Another debugging system of the present invention is further provided with stalled execution unit avoidance means for preventing the transmission of activation instructions to the debugging program activation means that corresponds to an execution unit that is in a stalled state.

According to the present invention, the provision of the stalled execution unit avoidance means can prevent the problem in which a debugging program activation instruction is transmitted to the debugging program activation means that corresponds to an execution unit that is in a stalled state, thus preventing the execution of the debugging operation.

Further, in another debugging system of the present invention, a debugging program that is activated in any of a plurality of execution units is provided with:

a physical-virtual address conversion means for converting a virtual address to a physical address; and an information extraction means that uses a physical address that has been converted by the physical-virtual address conversion means and that takes into consideration the structure by which the operating system arranges control information in memory to extract necessary information from storage areas that are used by the execution unit that is the target of debugging and that differs from the execution unit in which the debugging program is activated.

According to the present invention, the provision of the physical-virtual address conversion means and the information extraction means in the debugging program allows the debugging program to refer to storage areas that are used by execution units that differ from activated execution units. As a result, the content of storage areas can be checked from the outside even when an execution unit that is the target of debugging is in a stalled state.

Further, another debugging system of the present invention is further provided with a fault detection means for detecting an execution unit in which a fault has occurred from among the plurality of execution units and for generating an activation instruction for carrying out debugging of the execution unit that has been detected.

According to the present invention, when a fault occurs in any execution unit among the plurality of execution units, a debugging program activation instruction for debugging the fault can be generated by the fault detection means to automatically activate a debugging program. Accordingly, the task of debugging can be carried out without generating a debugging program activation instruction from the outside.

Further, in another debugging system of the present invention, an interruption handler, which is a program that is first activated for processing an interruption when an interruption occurs in each of the plurality of execution units, is provided with:

an information acquisition/control means for, when an interruption is generated from another execution unit, acquiring information in memory that has been set in advance; and a response generation means for transmitting the information that has been acquired by the information acquisition/control means to the execution unit that generated the interruption;

and a debugging program that is activated in any of the plurality of execution units is provided with:

an inter-execution unit interruption generation means for generating an interruption to an execution unit that is the target of debugging; and a response reception means for receiving a response from an execution unit that is the target of debugging.

According to the present invention, the interruption handler is provided with an information acquisition/control means for acquiring information in a memory and the debugging program is provided with an inter-execution unit interruption generation means, whereby information in memory such as a cache memory or registers can be acquired to carry out the task of debugging even when the execution unit that is the target of debugging is in a stalled state.

As described in the foregoing explanation, the provision of a debugging program activation instruction distribution means and debugging program activation means in the present invention can realize a configuration that enables the activation of a debugging program in any execution unit and at any timing, and the invention can therefore obtain the effect of causing the generation of a fault in a state in which only the normal operation program is being executed, or can proceed with operations until immediately before the generation of the fault and then activate a debugging program in the execution unit that carries out the process that causes the fault to occur and then implement the task of debugging.

BEST MODE FOR CARRYING OUT THE INVENTION

Explanation next regards exemplary embodiments of the present invention with reference to the accompanying figures.
(First Exemplary Embodiment)

Explanation first regards the debugging system of the first exemplary embodiment of the present invention with reference to the accompanying figures.

Figure 1:
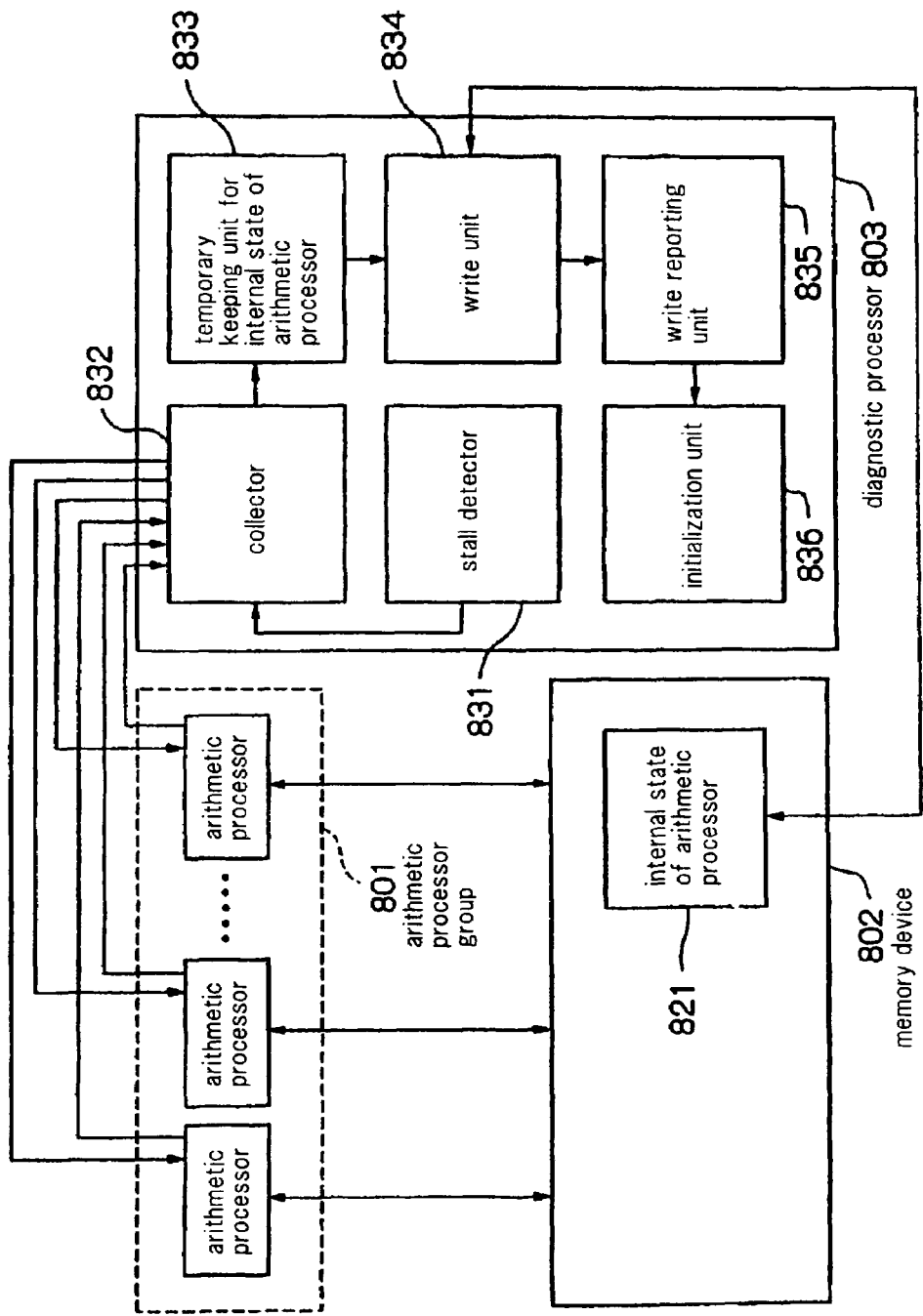
FIG. 1 is a block diagram showing an example of the configuration of a conventional debugging system.
Figure 2:
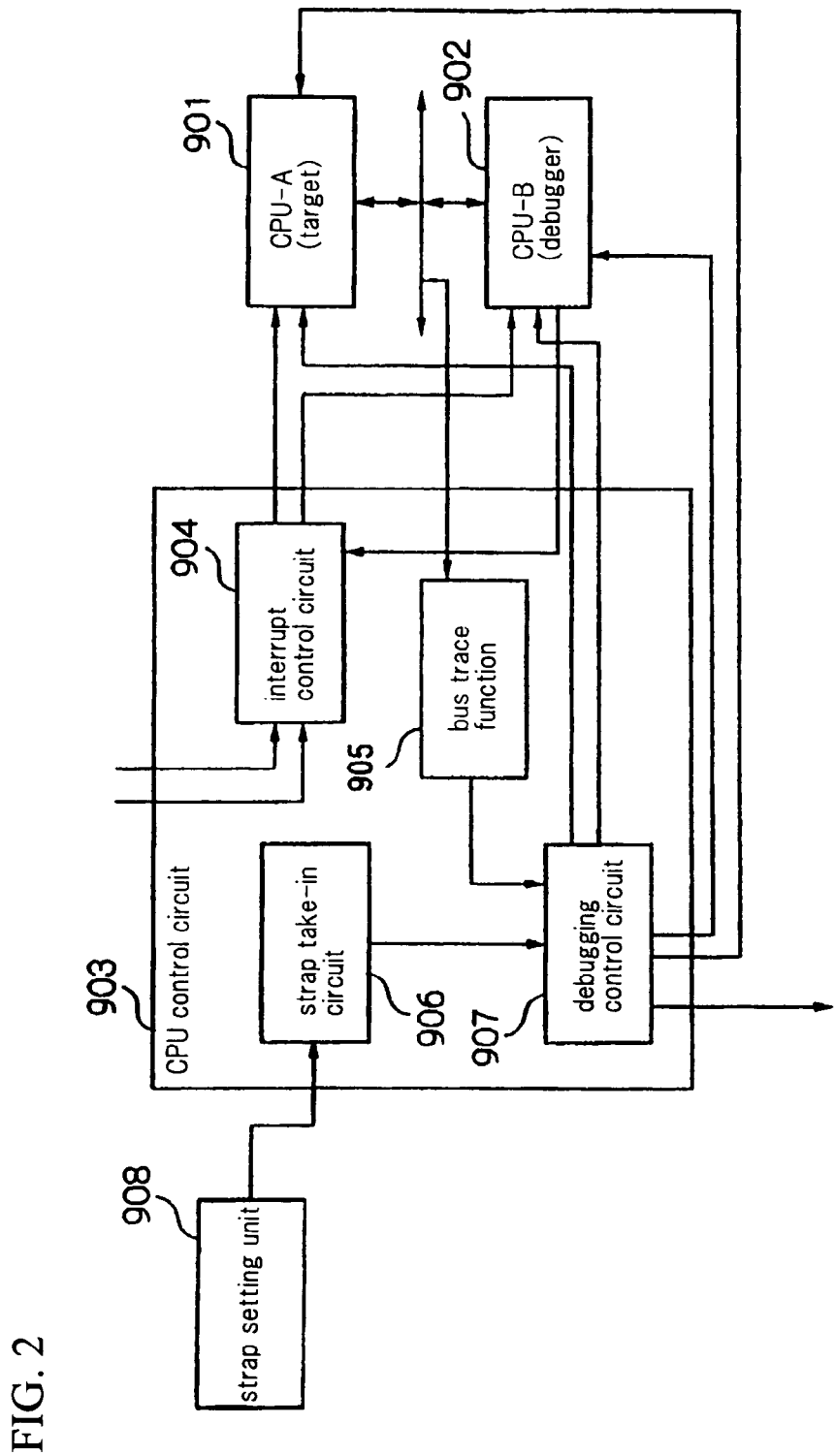
FIG. 2 is a block diagram showing another example of the configuration of a conventional debugging system.
Figure 3:
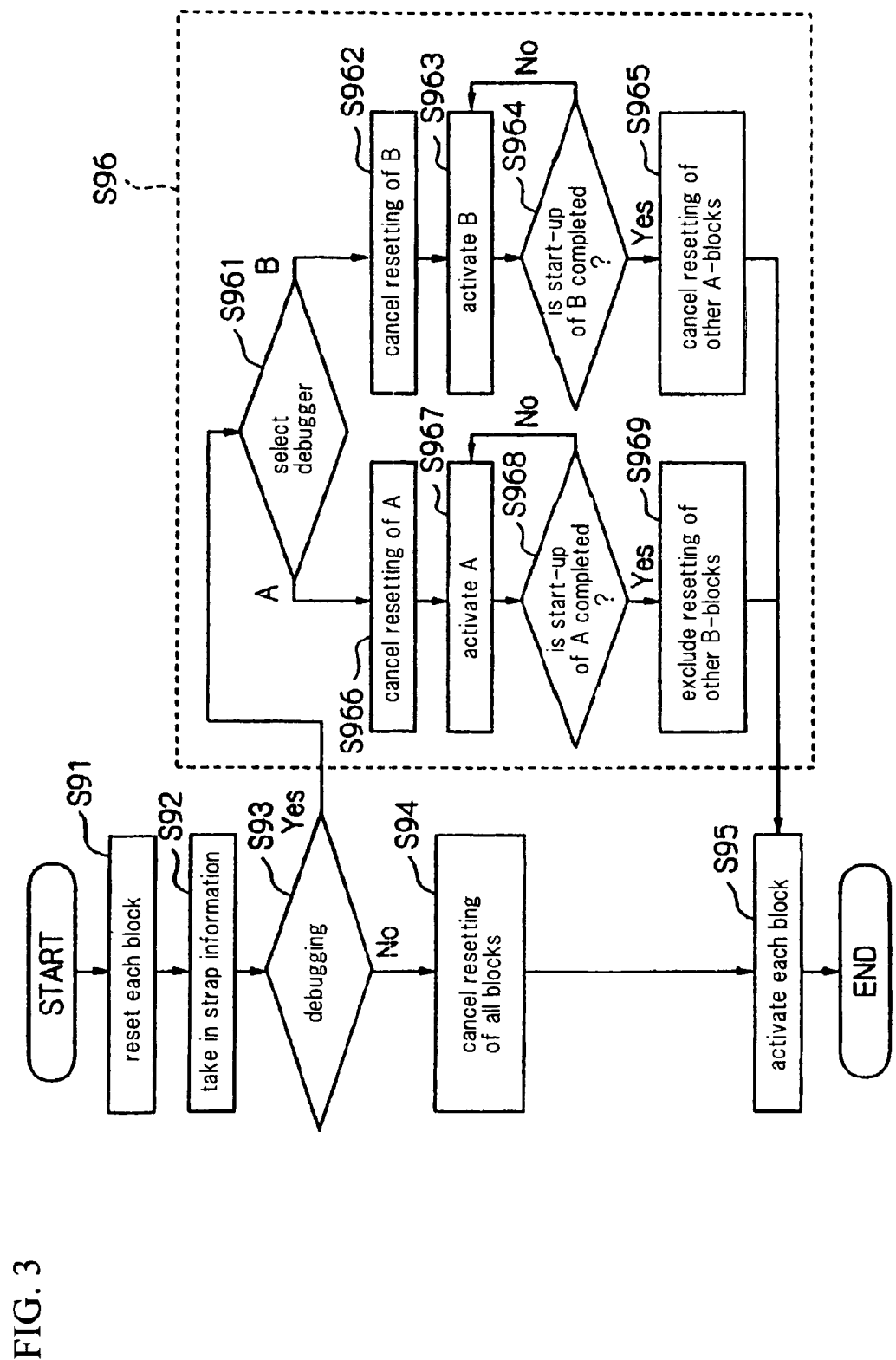
FIG. 3 is a flow chart for explaining the operation of the debugging system shown in FIG. 2.
Figure 4:
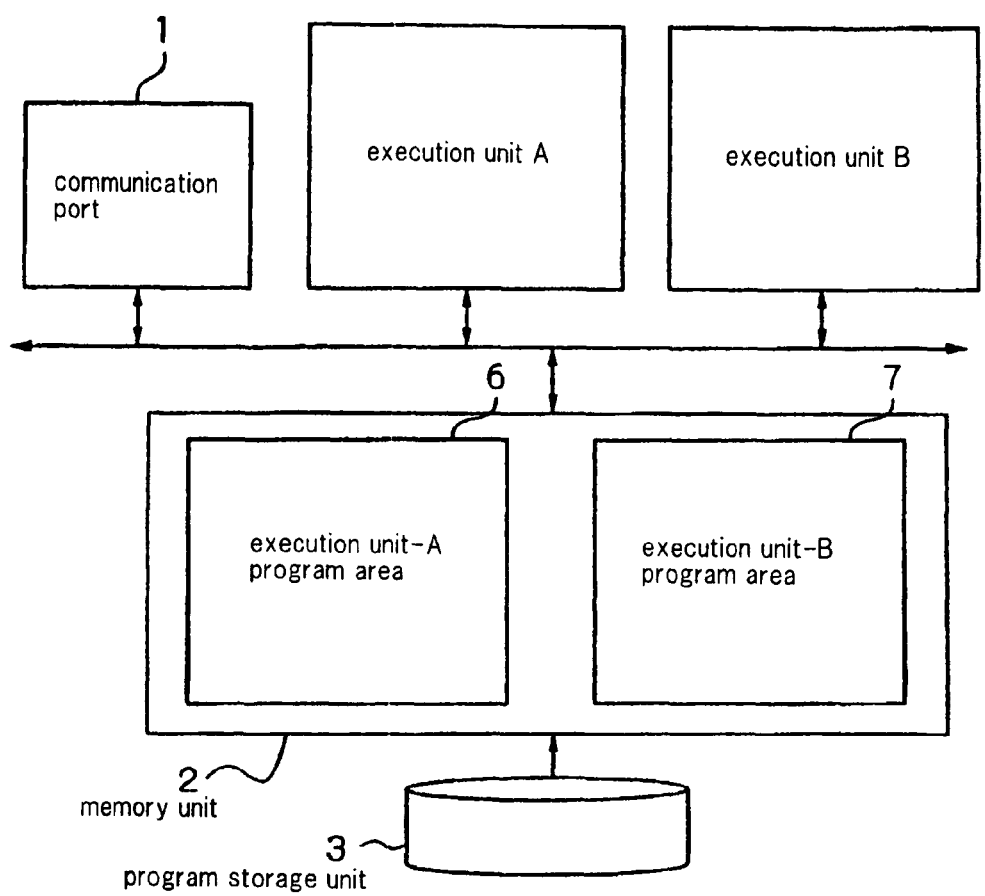
FIG. 4 is a block diagram showing an example of the configuration of target hardware for working the present invention.

As shown in FIG. 4, the debugging system of the present exemplary embodiment is provided with: two execution units A and B, communication port 1, rewriteable memory unit 2 such as RAM (Random Access Memory), and program storage unit 3 composed of, for example, an HDD (Hard Disk Drive) and in which various programs are stored. The memory areas of memory unit 2 are made up from execution unit-A program area 6 and execution unit-B program area 7.

Figure 5:
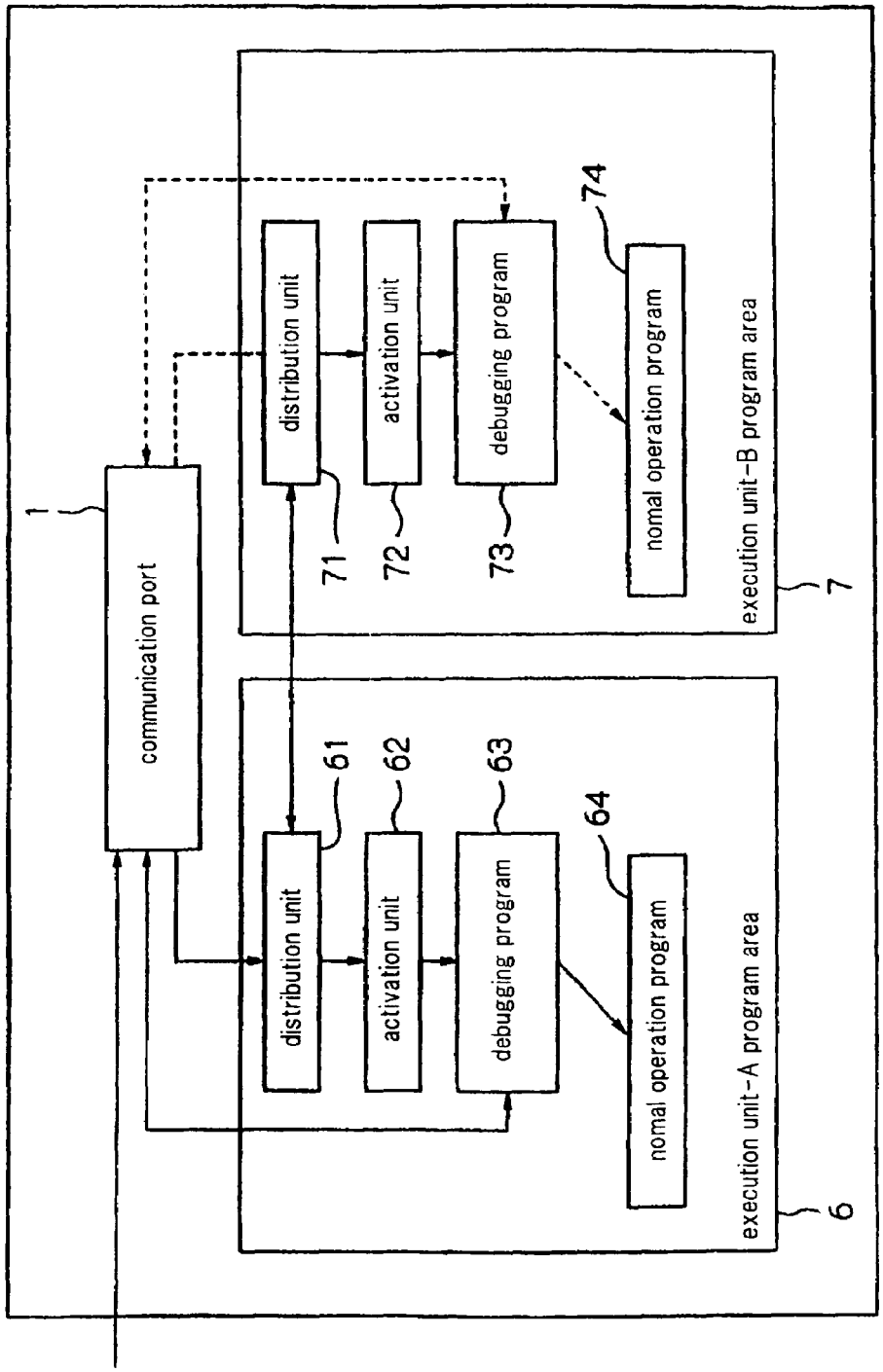
FIG. 5 is a block diagram showing the configuration of the debugging system of the first exemplary embodiment of the present invention.

As shown in FIG. 5, execution unit-A program area 6 is provided with: debugging program activation instruction distribution unit (represented as "distribution unit" in FIG. 5) 61, debugging program activation unit (represented as "activation unit" in FIG. 5) 62, debugging program 63, and normal operation program 64. These components are provided as programs that are executed on execution unit A.

Further, as shown in FIG. 5, execution unit-B program area 7 is also provided with debugging program activation instruction distribution unit 71, debugging program activation unit 72, debugging program 73, and normal operation program 74. These components are provided as programs that are executed on execution unit B.

In this case, debugging program activation instruction distribution units 61 and 71 and debugging program activation units 62 and 72 are simply stored as programs in memory unit 2 and do not perform various operations until activated on execution units A and B. However, in the interest of simplifying the explanation, debugging program activation instruction distribution units 61 and 71 and debugging program activation units 62 and 72 are here described as components that individually perform various operations.

These various programs are read from program storage unit 3 into memory unit 2 and stored in prescribed areas in memory unit 2.

Upon receiving activation instructions of debugging programs (hereinbelow referred to as simply "activation instructions") that are sent from communication port 1, debugging program activation instruction distribution units 61 and 71 distribute the received debugging program to the execution unit that is designated by the activation instructions. Debugging program activation units 62 and 72 are provided corresponding to each of execution units A and B and, based on the activation instructions that have been distributed by activation instruction distribution units 61 and 71, activate corresponding debugging programs 63 and 73.

Figure 6:
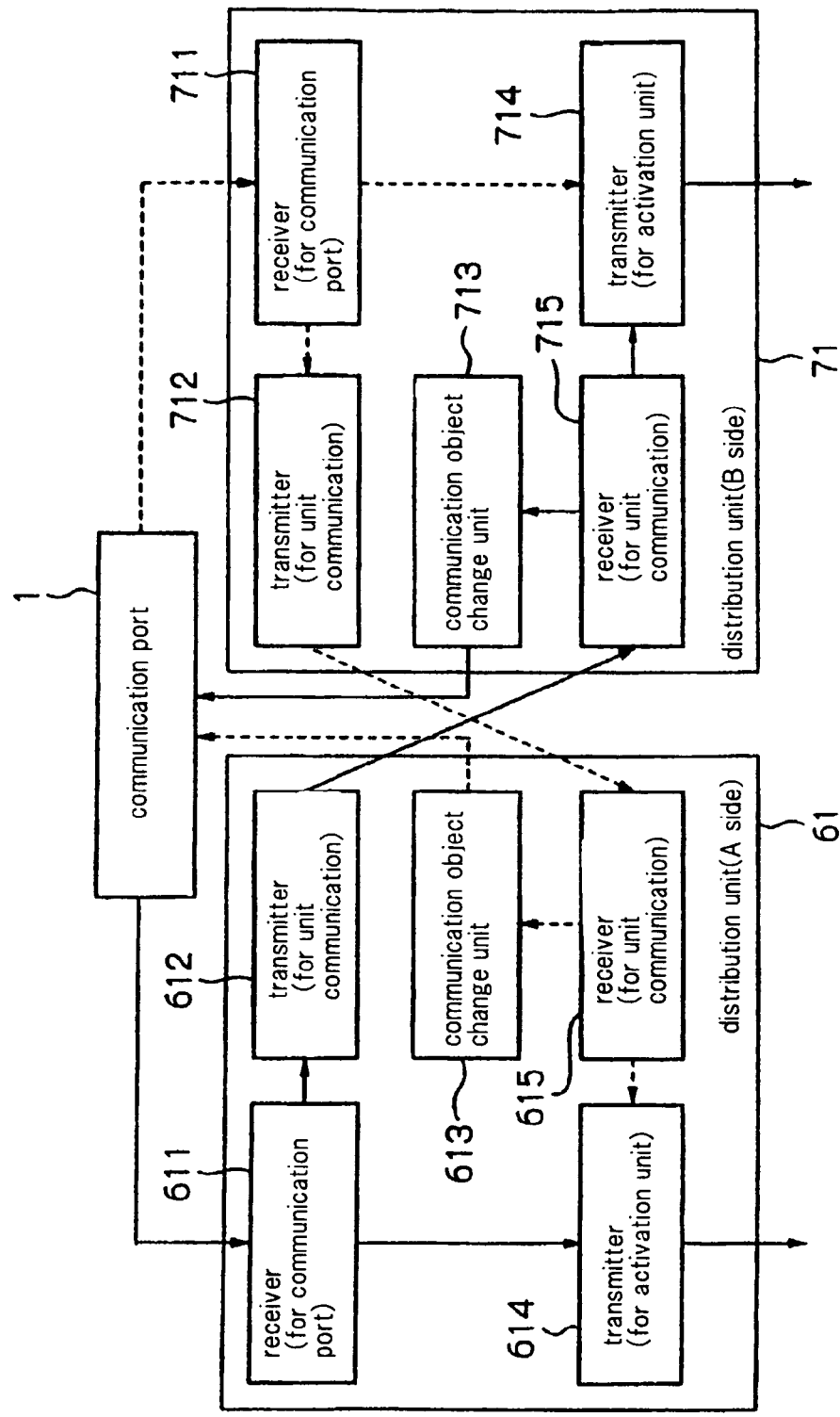
FIG. 6 is a block diagram showing an example of the debugging program activation instruction distribution unit shown in FIG. 5.

As shown in FIG. 6, debugging program activation instruction distribution unit 61 is provided with: receiver 611 for receiving activation instructions from communication port 1; transmitter 614 for transmitting activation instructions to debugging program activation unit 62; transmitter 612 for using inter-execution unit communication to transmit activation instructions to the other execution unit B; receiver 615 for using inter-execution unit communication to receive activation instructions that are transmitted in from the other execution unit B; and communication object change unit 613 for changing the execution unit that is the object of communication of communication port 1.

Debugging program activation instruction distribution unit 71 is similarly provided with: receiver 711, transmitter 714, transmitter 712, receiver 715, and communication object change unit 713.

Figure 7:
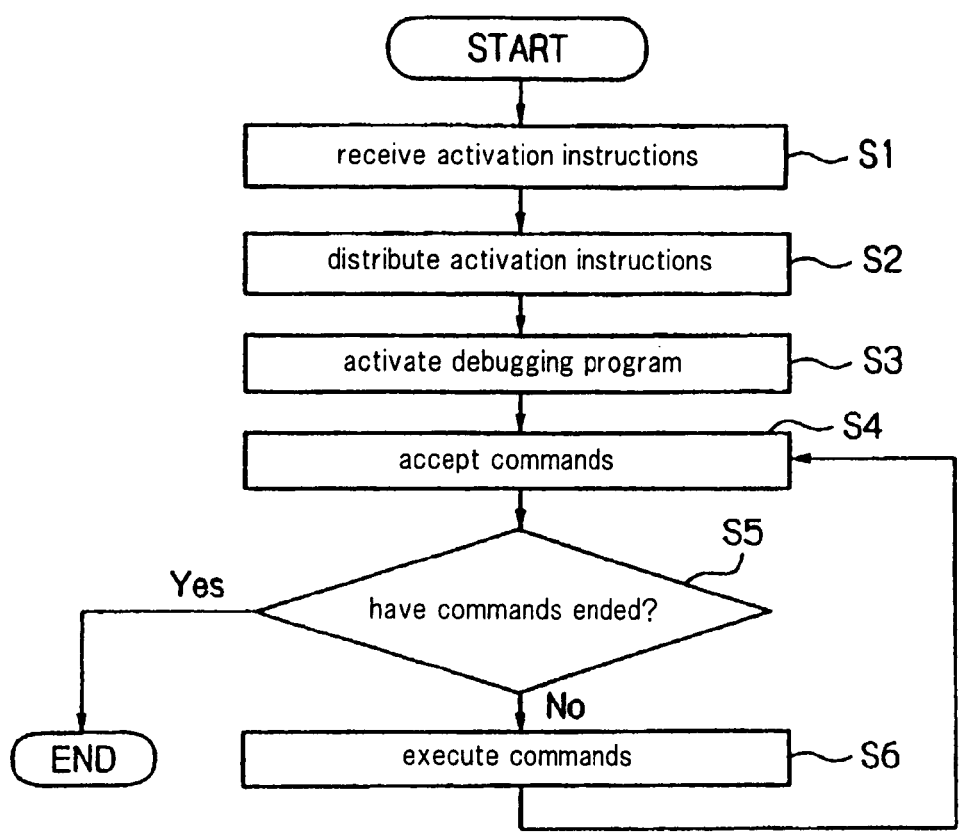
FIG. 7 is a flow chart for explaining the operation of the debugging system shown in FIG. 5.

Explanation next regards the overall operation of the debugging system of the present exemplary embodiment with reference to FIG. 5 and the flow chart of FIG. 7.

An activation instruction that has been applied as input in an outside control terminal (not shown) is first sent to communication port 1. This activation instruction includes code that designates the execution unit in which the debugging program is to be activated and code that designates the type of debugging program that is to be activated.

In this case, debugging program activation instruction distribution units 61 and 71, having received debugging program activation instructions from communication port 1 (Step S1), distribute the activation instructions to the execution units in which debugging programs are to be activated and that are designated in the activation instructions and issue the activation instructions to debugging program activation units 62 and 72 (Step S2). Debugging program activation units 62 and 72 then activate debugging programs 63 and 73 (Step S3).

When debugging programs 63 and 73 receive commands from communication port 1 (Step S4), command analysis units (not shown) that are provided by debugging programs 63 and 73 analyze the commands. When the command received from communication port 1 is a debugging command ("NO" in Step S5), the operation content is executed according to the command, and the debugging task is carried out. In this case, data may also be transmitted and received through communication port 1 depending on the work content. When the command received from communication port 1 is an "end" command ("YES" in Step S5), debugging programs 63 and 73 end the debugging.

The command analysis units in this case are means for analyzing the content of commands that have been received and are made up from debugging programs 63 and 73. In addition to the above-described "end" command, the types of commands include, for example, commands for reading the content of a memory or register and commands for writing values to a memory or register.

Figure 8:
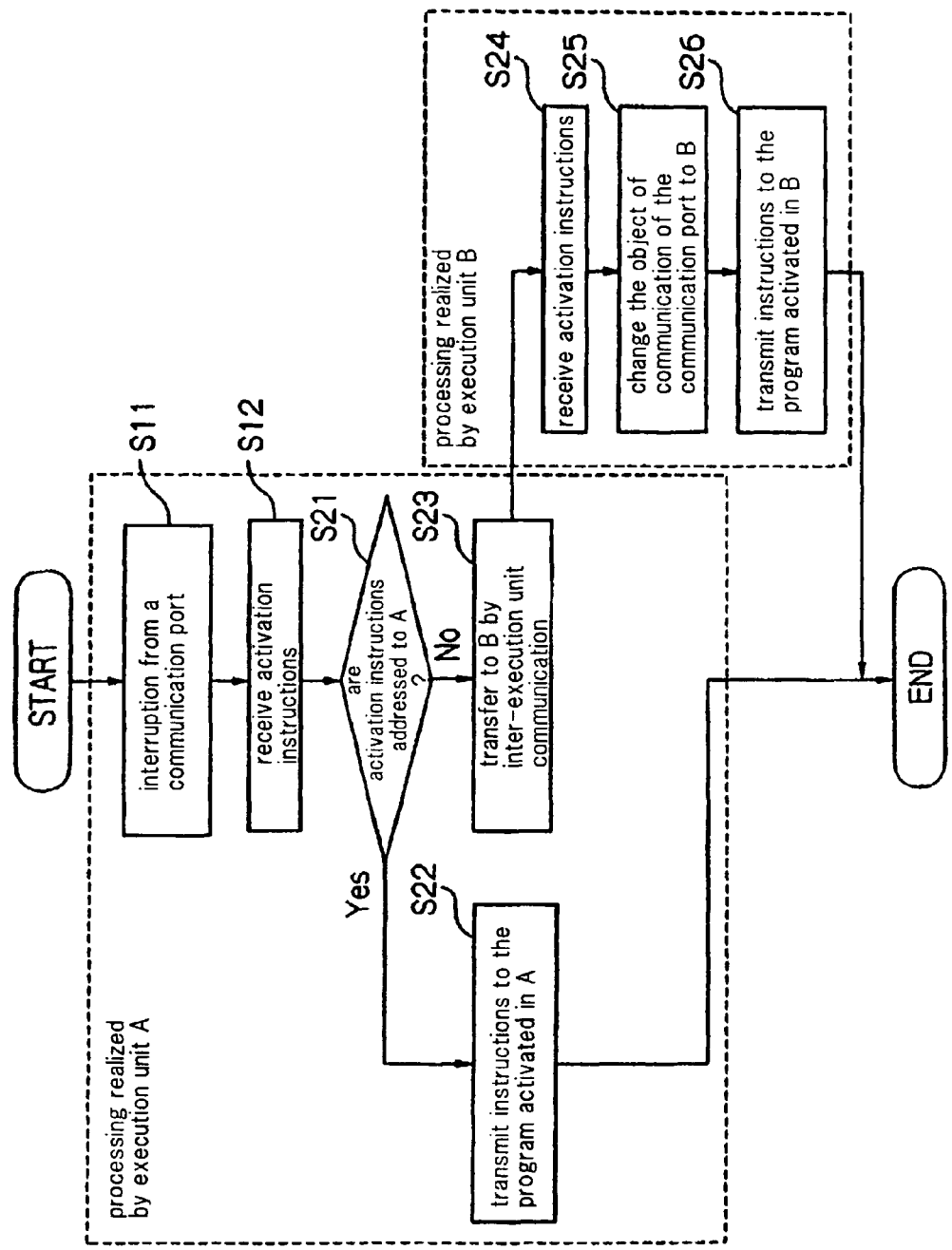
FIG. 8 is a flow chart for explaining the operation of the debugging program activation instruction distribution unit shown in FIG. 5 and FIG. 6.

Explanation next regards the operations of debugging program activation instruction distribution units 61 and 71 with reference to FIG. 6 and the flow chart of FIG. 8. Explanation here regards a case in which the initial value of the interruption destination of communication port 1 is execution unit A.

First, when a debugging program activation instruction is transmitted in from communication port 1, an interruption is generated to execution unit A (Step S11) and activation instruction distribution unit 61 is activated. Receiver 611 then receives the activation instruction from communication port 1 (Step S12) and determines the destination. In this case, when the destination is execution unit A ("YES" in Step S21), transmitter 614 transmits the activation instruction to debugging program activation unit 62 of execution unit A (Step S22). On the other hand, when the destination is execution unit B ("NO" in Step S21), transmitter 612 that uses inter-execution unit communication transmits the activation instruction to execution unit B (Step S23). When activation instruction distribution unit 71 on the execution unit-B side next receives this activation instruction by means of receiver 715 (Step S24), communication object change unit 713 changes the communication object of communication port 1 to execution unit B (Step S25), and transmitter 714 transmits the activation instruction to debugging program activation unit 72.

In the present exemplary embodiment, the explanation assumes that the debugging program is activated by the reception of a debugging program activation instruction from communication port 1. Another configuration is also possible in which a timer is used to apply activation instructions, whereby a debugging program is activated following the passage of a fixed time interval and the state at that time then checked. Alternatively, a program may activate the debugging program by arrival of the program at a specific position according to a method in which a breakpoint is set or a method in which the program that is the object of debugging itself issues an activation instruction at the time of arriving at a particular point.

Further, although explanation here regards an example in which the system is provided with two execution units A and B in the present exemplary embodiment, the present exemplary embodiment can easily be extended to a system provided with any number such as three or more of execution units.

Further, although explanation here regards a case in which execution units that activate debugging programs in the present exemplary embodiment are designated in advance and debugging activation instruction distribution units 61 and 71 distribute activation instructions to execution units designated by the activation instructions, a configuration is also possible in which the execution units that activate debugging programs are selected automatically. For example, debugging program activation instruction distribution units 61 and 71 may be of a configuration such that activation instructions are sent to debugging program activation units that correspond to execution units that are determined based on the operating states of execution units A and B. In this case, the operating states of execution units A and B indicate, for example, the vacant capacity of memory areas used by each of execution units A and B or the state of linkage between execution units A and B.

When the distribution destination is selected based on the vacant capacity of the memory areas of each of execution units A and B, activation instruction distribution units 61 and 71 may be of a configuration such that the vacant capacity of the memory areas of each of execution units A and B is detected and activation instructions are distributed to the debugging program activation unit that corresponds to an execution unit for which a surplus exists in the detected vacant capacity. Modes for adopting this configuration include a mode in which activation instruction distribution units 61 and 71 on each of execution units A and B detect the vacant capacity and then report the vacant capacity to other execution units; and a mode in which activation instruction distribution units 61 and 71 on each of execution units A and B independently detect the vacant capacity by directly referring to memory areas used by other execution units.

Explanation in the present exemplary embodiment takes as an example a system in which two execution units A and B carry out linked operations. When a program used in a system in which three or more execution units perform linked operation is the target of debugging, the distribution destination of activation instructions can be determined by ascertaining the state of linkage.

In this case, activation instruction distribution units 61 and 71 may be of a configuration such that each program first detects that the communication paths with other programs are secured and then distributes activation instructions to execution units having little relation or no relation to programs that perform linked operation and that are the targets of debugging. As a method of detecting that communication paths have been secured in this case, a method can be adopted in which the program detects that a function call has been carried out to secure a communication path, or a method can be adopted in which memory areas in which the status of the communication path is saved are surveyed.

On the other hand, when the program that is the object of debugging performs linked operation with programs that operate on other execution units, a configuration can be adopted in which the activation instructions are distributed not only to the execution unit in which the program that is the object of debugging is operating but also to the execution units that are linked, and the linked programs are then taken as the object of debugging as a group.

Explanation next regards the effects of the debugging system of the present exemplary embodiment.

In the present exemplary embodiment, debugging program activation instruction distribution units 61 and 71 and debugging program activation units 62 and 72 are together provided as programs that are executed on execution units A and B and are further configured such that a debugging program is activated on either of execution units A and B after the reception of activation instructions, whereby an increase in the efficiency of the task of debugging can be realized without an attendant increase in cost due to hardware dedicated to debugging.

Further, the provision of debugging program activation instruction distribution units 61 and 71 and debugging program activation units 62 and 72 in the present exemplary embodiment enables the activation of a debugging program on any execution unit and at any timing. As a result, a fault can be generated in a state in which only the normal operation program is being executed, or the normal operation program can be executed until immediately before the generation of a fault, following which a debugging program can be activated on the execution unit that is carrying out the process that caused the occurrence of a fault and the task of debugging is then carried out.

Further, a configuration is also possible in the present exemplary embodiment in which a timer can be used to apply activation instructions of debugging programs and debugging programs then activated after the passage of a fixed time interval. The adoption of this configuration can eliminate the influence of the divergence of the timing of activation of the debugging program that results when a debugging technician applies the activation instructions, and further, can adjust the activation timing with a high degree of time accuracy.

In the present exemplary embodiment, moreover, a configuration can be adopted in which a program activates the debugging program by the arrival of the program at a specific point through the use of a method in which a breakpoint is set or a method in which the program that is the object of debugging itself issues the activation instructions at the time of arriving at a particular location. By adopting this type of configuration, a debugging program can be activated at a point for which observation is desired even when conditions prevent the time of arrival at the site that is to be observed from being fixed by only adjusting the activation time.

In some cases, moreover, memory areas are being used by the normal operation program that is already in operation and the debugging program therefore cannot be additionally activated. On the other hand, debugging programs include types that can carry out the task of debugging regardless of the execution unit in which they are activated. In such cases, a configuration may be adopted in the present exemplary embodiment in which the vacant capacity of the memory area of each execution unit is detected and activation instructions are distributed to execution units having a surplus of vacant capacity. The adoption of this type of configuration enables avoidance of execution units in which the debugging program cannot be activated due to insufficient vacant capacity when issuing activation instructions.

In addition, activating a debugging program on an execution unit that is executing a program that involves linked operation has an influence upon the operation of the program for which linked operation is being carried out and obstructs the debugging task. In such cases, a configuration can be adopted in the present exemplary embodiment in which the state of linkage is ascertained and activation instructions then issued. By adopting this type of configuration, the debugging program can be activated on an execution unit that differs from the execution unit that is executing the program for which operation is linked.

(Second Exemplary Embodiment)

Explanation next regards the debugging system of the second exemplary embodiment of the present invention with reference to the accompanying figures.

The first exemplary embodiment described in the foregoing explanation was a case in which the present invention was applied to a system in which the execution unit that is the object of communication of a communication port can be changed. However, depending on the system, there are some systems in which the execution unit that is the object of communication of a communication port cannot be changed, i.e., in which the execution unit that is the communication object of a communication port is fixed. When the present invention is applied to this type of system, a command cannot be transmitted to a debugging program that has been activated on an execution unit that is not the communication object of a communication port, even when a debugging program activation instruction distribution unit is provided for each execution unit.

The debugging system of the present exemplary embodiment is of a configuration that can be applied to a system in which execution units that are the communication objects of communication ports are fixed.

Figure 9:
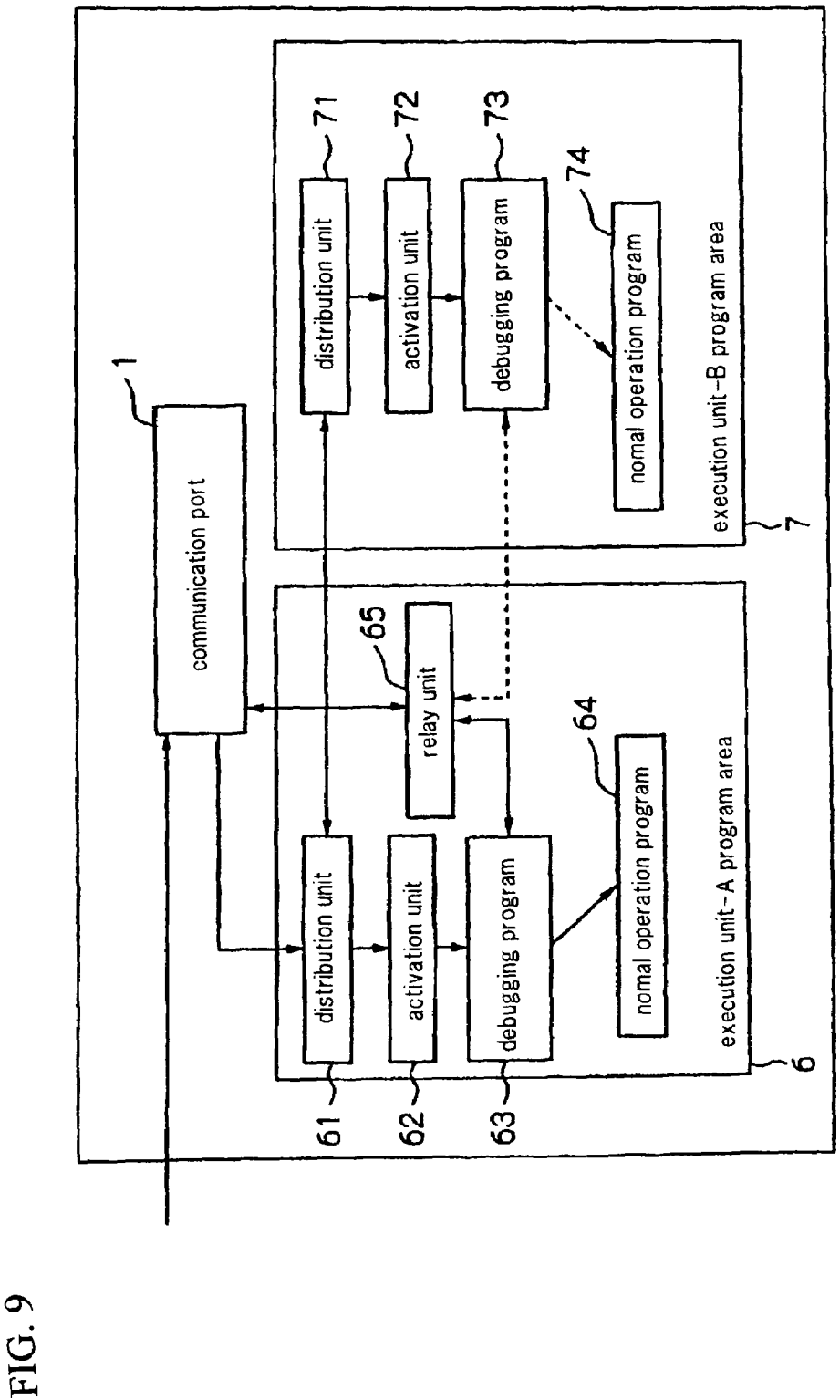
FIG. 9 is a block diagram showing the configuration of the debugging system of the second exemplary embodiment of the present invention.

As shown in FIG. 9, the debugging system of the present exemplary embodiment is of a configuration in which, compared to the configuration in the first exemplary embodiment shown in FIG. 5, relay unit 65 has been added for relaying communication of a debugging program that is executed in another execution unit.

Relay unit 65 is a component executed on execution unit A of two execution units A and B and relays commands, which have been transmitted from communication port 1 to debugging programs 63 and 73, to the debugging program on an execution unit that has been designated by an activation instruction.

The execution unit that is the communication object of communication port 1 in the present exemplary embodiment is fixed to execution unit A. When the destination of a command from communication port 1 is execution unit A, relay unit 65 transmits the command to debugging program 63 of execution unit A, and when the destination of a command from communication port 1 is execution unit B, relay unit 65 transmits this command to debugging program 73 of execution unit B.

Activation instruction distribution units 61 and 71 in the present exemplary embodiment enables the omission of, of activation instruction distribution units 61 and 71 shown in FIG. 6, communication object change units 613 and 713, inter-execution unit communication receiver 615 on the execution unit-A side, and inter-execution unit communication transmitter 712 and communication port receiver 711 on the execution unit-B side.

The overall operation in the present exemplary embodiment is identical to that of the first exemplary embodiment of the present invention. Other than the omission of the step for changing the communication object of the communication port in FIG. 8, the operation of activation instruction distribution units 61 and 71 is identical to the first exemplary embodiment of the present invention.

Although explanation of the present exemplary embodiment regards an example of a system provided with two execution units A and B, the present exemplary embodiment can be easily extended to any number such as three or more execution units.

Explanation next regards the effects of the debugging system of the present exemplary embodiment.

In the present exemplary embodiment, relay unit 65 is provided in execution unit A program area 6 for relaying communication to debugging programs 63 and 73, and this relay unit 65 is provided to relay the communication of debugging program 73 that is executed in execution unit B. The present invention can therefore be applied to a system in which the execution unit that is the object of communication of communication port 1 is fixed to execution unit A and cannot be changed. In addition, because debugging program 73 on execution unit B that does not directly communicate with communication port 1 can also communicate by means of relay unit 65, a plurality of debugging programs 63 and 73 can be used simultaneously on a plurality of execution units A and B.

(Third Exemplary Embodiment)

Explanation next regards the debugging system of the third exemplary embodiment of the present invention with reference to the accompanying figures.

As with the debugging system of the first exemplary embodiment, the debugging system of the present exemplary embodiment is a system in which the present invention is applied to a system that allows change of the execution unit that is the object of communication of a communication port.

In a system that allows change of the execution unit that is the object of communication of a communication port, commands to a debugging program can be transmitted by switching the communication ports. However, when a plurality of debugging programs are placed in operation at the same time, problems can be expected to arise in switching the communication ports. In addition, a certain amount of overhead is required for the process of changing the execution unit that is the object of a communication of communication port.

As a result, even when the execution unit that is the object of communication of a communication port can be changed, using the relay unit in the debugging system of the second exemplary embodiment shown in FIG. 9 to relay various types of commands to debugging programs eliminates the need for the process of changing communication ports and can achieve a reduction of processing.

However, when a configuration is adopted in which this relay unit is provided in only a specific execution unit, the occurrence of a stalled state in the execution unit in which the relay unit is provided also prevents the relay unit itself from functioning.

As a result, the debugging system of the present exemplary embodiment is of a configuration in which a relay unit is provided for each execution unit such that various types of commands can be relayed to debugging programs even in the event of a stalled state in any execution unit.

The following explanation regards a case in which the present invention is applied to a system in which there are three execution units A, B, and C.

Figure 10:
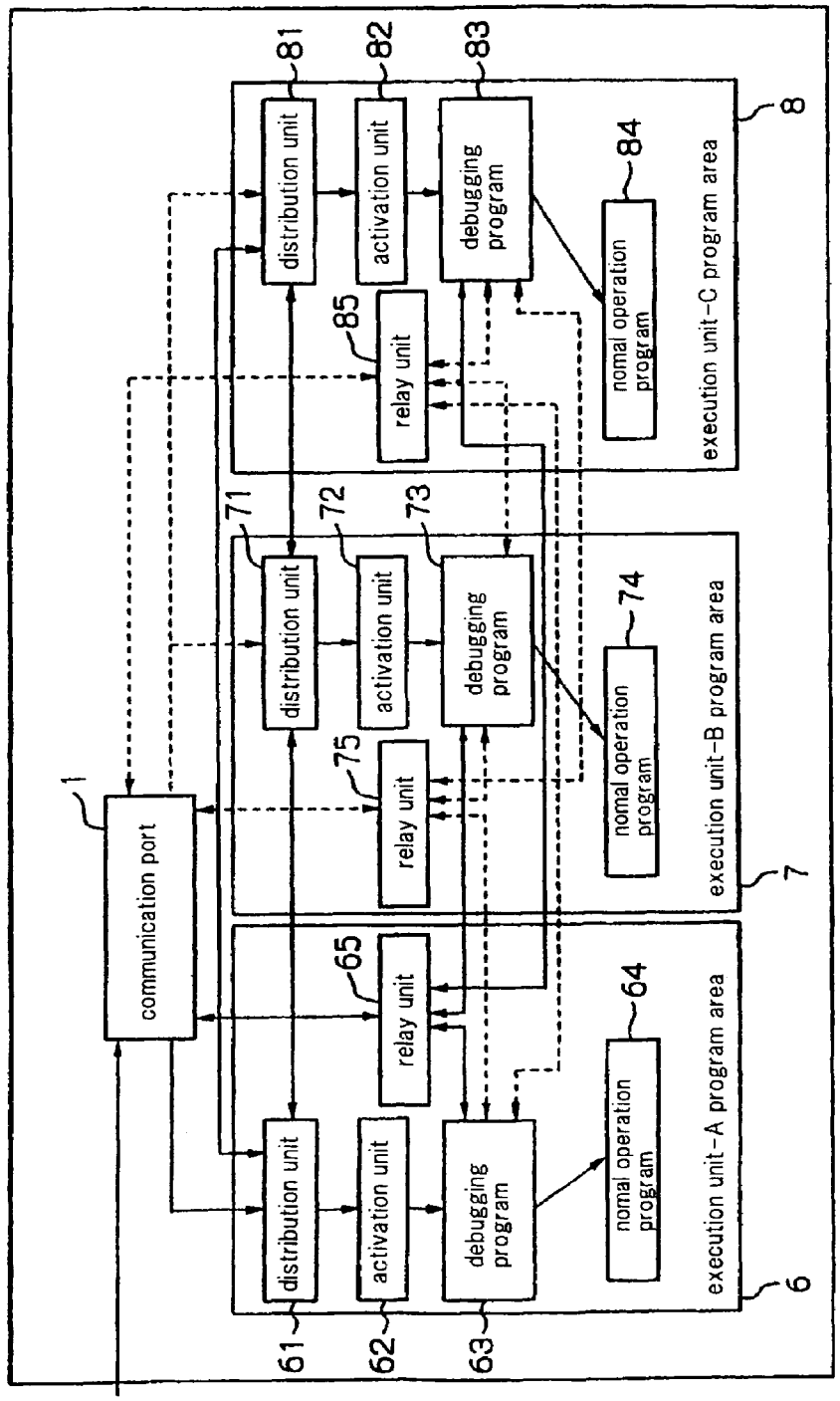
FIG. 10 is a block diagram showing the configuration of the debugging system of the third exemplary embodiment of the present invention.

As shown in FIG. 10, the debugging system of the present exemplary embodiment is of a configuration in which, compared to the configuration in the first exemplary embodiment shown in FIG. 5, execution unit-C program area 8 is newly added, and further, relay unit 65 on the execution unit-A side, relay unit 75 on the execution unit-B side, and relay unit 85 on execution unit-C side are added for relaying the communication of debugging programs executed in other execution units.

Relay units 65, 75, and 85 in the present exemplary embodiment are components executed on three execution units A, B, and C, respectively; these relay units 65, 75, and 85 relaying the commands that have been transmitted from communication port 1 to debugging programs 63, 73, and 83 to the debugging program on the execution unit that has been designated by an activation instruction.

Execution unit-C program area 8 is provided with: debugging program activation instruction distribution unit 81, debugging program activation unit 82, debugging program 83, and normal operation program 84. These components are formed as programs that are executed on execution unit C.

The operation of activation instruction distribution units 61 and 71 in the present exemplary embodiment is similar to that in the first exemplary embodiment of the present invention. In addition, the operation of activation instruction distribution unit 81 is similar to that of activation instruction distribution units 61 and 71. However, because switching is considered to be pointless when activating second and subsequent debugging programs, the step of changing the object of communication of communication port 1 in the operations of activation instruction distribution units 61, 71, and 81 need not be carried out.

Although explanation regards an example of a system provided with three execution units A, B, and C in the present exemplary embodiment, the present exemplary embodiment can be easily extended to any number, such as four or more, of execution units.

Explanation next regards the effect of the debugging system of the present exemplary embodiment.

In the present exemplary embodiment, relay units 65, 75, and 85 are provided in each of execution units A, B, and C for relaying communication to debugging programs, and the present exemplary embodiment is of a configuration that allows the communication of debugging programs executed in other execution units to be relayed at any execution unit. As a result, even in the event of a stalled state in a particular execution unit, a plurality of debugging programs 63, 73, and 83 can be used simultaneously in a plurality of execution units A, B, and C without requiring problematic switching of execution units A, B, and C that are the objects of communication of communication port 1.

For example, in the debugging system of the present exemplary embodiment shown in FIG. 10, an example is described in which three debugging programs 63, 73, and 83 are each activated.

In the example of FIG. 10, execution unit A is set as the execution unit that is the object of communication of communication port 1. As a result, various types of commands are relayed to debugging program 63, debugging program 73, and debugging program 83 by way of relay unit 65 that is provided for execution unit A. When execution unit A enters a stalled state for any reason, relay unit 65 also ceases functioning. As a result, the execution unit that is the object of communication of communication port 1 is changed from execution unit A to execution unit B, and the relay of various commands to debugging program 73 and 83 may be realized by way of relay unit 75 that is provided in execution unit B. In this way, debugging programs can be simultaneously activated at two execution units B and C without any need for the problematic process of switching the execution unit that is the object of communication in communication port 1 for each communication, for example, communication with debugging program 73 going to execution unit B and communication with debugging program 83 going to execution unit C.

(Fourth Exemplary Embodiment)

Explanation next regards the debugging system of the fourth exemplary embodiment of the present invention with reference to the accompanying figures.

In the above-described first to third exemplary embodiments, debugging program activation instructions were distributed to an execution unit designated by a debugging program activation instruction or to an execution unit selected by an activation instruction distribution unit. However, in some cases, the execution unit in which a debugging program is to be activated has already entered a stalled state and activation of the debugging program is therefore impossible.

To prevent the occurrence of this type of problem, the debugging system of the present exemplary embodiment is of a configuration in which, when selecting an execution unit in which a debugging program can be activated, execution units that are in a stalled state and in which a debugging program therefore cannot be activated are not selected.

Figure 11:
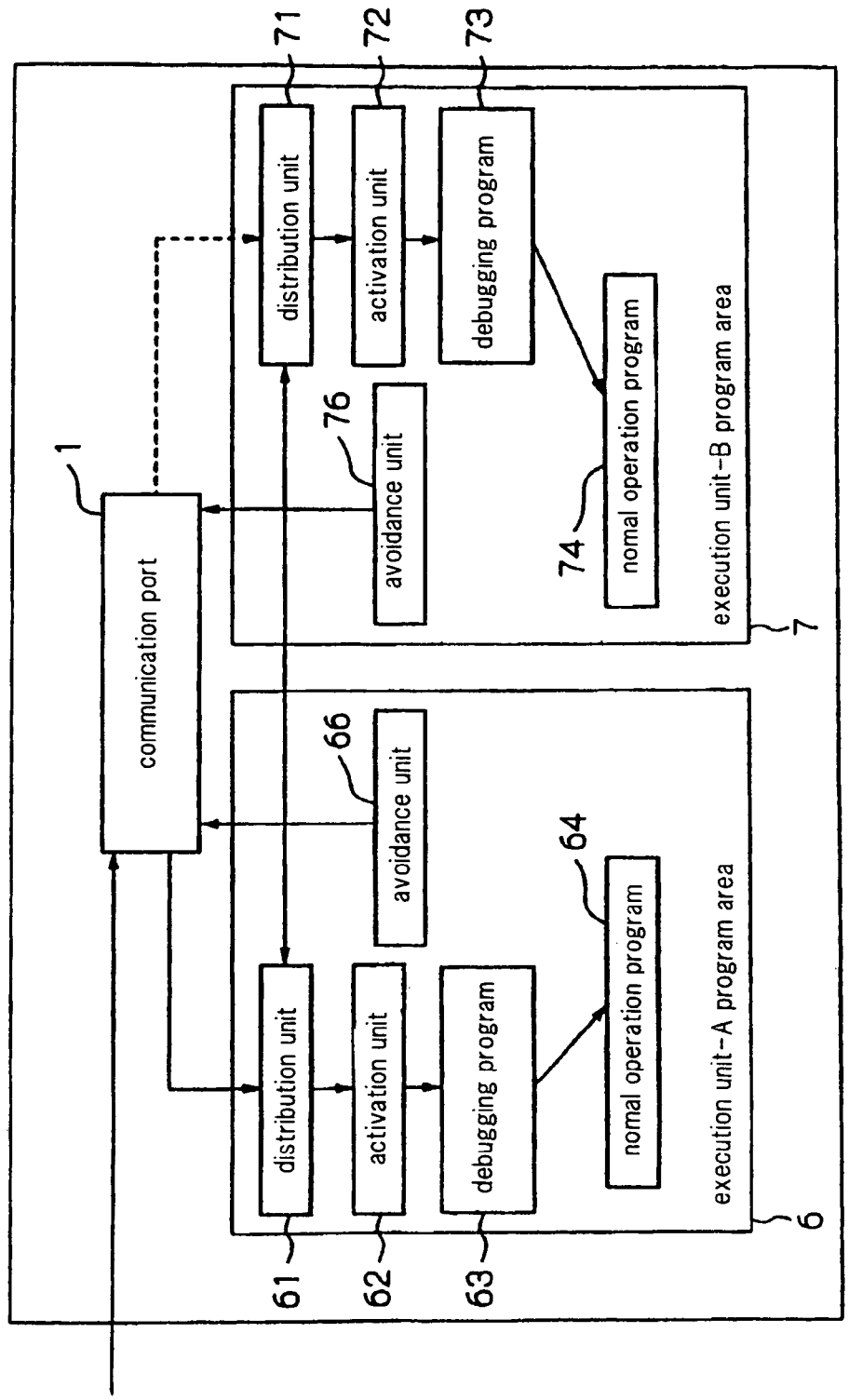
FIG. 11 is a block diagram showing the configuration of the debugging system of the fourth exemplary embodiment of the present invention.

As shown in FIG. 11, the debugging system of the present exemplary embodiment is of a configuration in which, compared to the configuration in the first exemplary embodiment shown in FIG. 5, stalled execution unit avoidance units (represented as "avoidance units" in FIG. 11) 66 and 76 are provided for executing a process for avoiding stalled execution units and sending activation instructions to activation instruction distribution units of execution units in which programs can be executed.

Stalled execution unit avoidance units 66 and 76 are arranged for each of a plurality of execution units A and B in which a debugging program can be activated. Stalled execution unit avoidance units 66 and 76 then carry out processing such that activation instructions are not sent to execution units that are in a stalled state.

More specifically, stalled execution unit avoidance unit 66 of execution unit A notifies communication port 1 to make execution unit A the execution unit that is the distribution source of activation instructions (in other words, the execution unit that is the object of communication of communication port 1), and stalled execution unit avoidance unit 76 of execution unit B notifies communication port 1 to make execution unit B the distribution source of activation instructions.

In a system provided with two execution units A and B as in FIG. 4, stalled execution unit avoidance units 66 and 76 are configured to be activated alternately as in "execution units A, B, A, B, . . . , A, B." In a system provided with three or more execution units, stalled execution unit avoidance units are configured to be successively activated using a timer, or by a program in a timer interrupt handler that is used during normal operations. The actual method of realizing stalled execution unit avoidance units 66 and 76 does not necessarily require alternate activation or successive activation, but this configuration that will be described is preferable for effective combination with the fault detector.

A timer interruption handler is a program that is first activated to process a timer interruption when a timer interruption occurs. If an execution unit is provided with a timer interruption function, this timer interruption handler is a typically used program.

The overall operation in the present exemplary embodiment is identical to that of the first exemplary embodiment of the present invention with the exception of the addition of a step for selecting an execution unit that can activate a debugging program before the reception of an activation instruction in the flow chart of FIG. 7.

Figure 12:
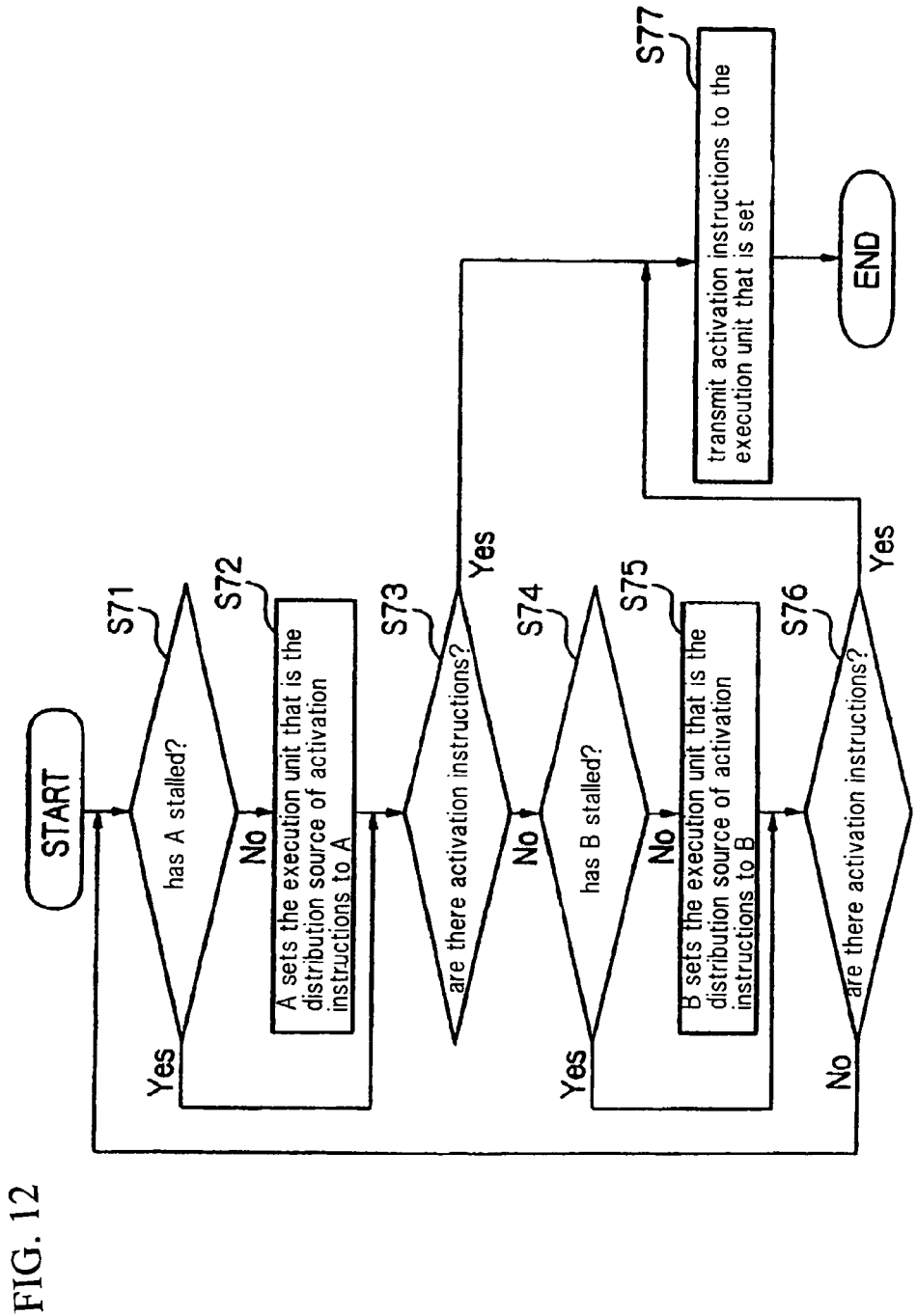
FIG. 12 is a flow chart for explaining the operation of the stalled execution unit avoidance unit shown in FIG. 11.

Explanation next regards the operation of stalled execution unit avoidance units 66 and 76 with reference to FIG. 12. In FIG. 12, Step S71 and Step S74 are not intentional selections, but rather processes of inevitable selection according to the conditions at that time point. In other words, Step S72 is a process executed by execution unit A, but the program is not executed when execution unit A is in a stalled state. As a result, the branch of Step S71 indicates continuation to Step S73 without carrying out the process of Step S72. Similarly, Step S75 is a process executed by execution unit B, but the program is not executed when execution unit B is in a stalled state. As a result, the branch of Step S74 indicates continuation to Step S76 without carrying out the process of Step S75. Explanation here assumes that B is the initial value of the execution unit that is the distribution source of activation instructions of a debugging program (in other words, the execution unit that is the object of communication of communication port 1).

First, when execution unit A is not in a stalled state at the stage of Step S71 ("NO" in Step S71), stalled execution unit avoidance unit 66 on execution unit A changes the set value of the execution unit that is the distribution source of debugging program activation instructions to execution unit A (Step S72). This process is carried out by changing the object of communication of communication port 1. When there is an activation instruction at this point ("YES" in Step S73), the activation instruction is transmitted to the execution unit that has been set (in this case, execution unit A) (Step S77).

On the other hand, when there are no activation instructions in Step S73 ("NO" in Step S73) and if execution unit B is not in a stalled state ("NO" in Step S74), stalled execution unit avoidance unit 76 on execution unit B changes the execution unit that is the source of distribution of debugging program activation instructions to execution unit B (Step S75). If there is an activation instruction at this point ("YES" in Step S76), the activation instruction is transmitted to the execution unit that has been set (execution unit B in this case) (Step S77). If there is no activation instruction ("NO" in Step S76), the process returns to the start.

If execution unit A stalls at Step S71, the process advances to Step S73 without carrying out the process of Step S72, but if there is an activation instruction, the execution unit that is the source of distribution of debugging program activation instructions is execution unit B. As a result, a state can be avoided in which the debugging program activation instruction is transmitted to execution unit A that is stalled and thus cannot be activated. If, on the other hand, execution unit B is stalled at Step S74, the same contrivance can avoid a state in which the debugging program activation instruction is transmitted to execution unit B that fails to activate.

This method can easily be extended for cases in which there are three or more execution units, and if any execution unit is operating, the operating execution unit is set as the distribution source of debugging program activation instructions.

However, caution is necessary regarding the following cases:

One point of caution is a case in which the execution unit that is the source of the distribution of debugging program activation instructions is changed to execution unit A in Step S72, following which execution unit A stalls before receiving an activation instruction in Step S73. The case is the same between Step S75 and Step S76. In this case, the debugging program activation instruction is not accepted, but after the passage of a fixed time interval, the execution unit that is the distribution source of activation instructions is changed by an execution unit that is not stalled, and a configuration is therefore desirable in which activation instructions are re-issued after the passage of a fixed time interval when activation fails. As a provision for a case in which all execution units stall, a configuration may be adopted in which the process is terminated and an error report made when activation fails despite the re-issue of activation instructions a fixed number of times.

Another point of caution is a case in which, even though execution was possible by the previously described method up to the debugging program activation instruction distribution unit, activation is prevented by a stalled state in the execution unit in which the debugging program designated by an activation instruction is to be activated. In this case, a configuration may be adopted in which an error report is made if activation cannot be confirmed after the passage of a fixed time interval. However, if a stalled state is detected by the fault detection method of a fault detection/activation instruction generator (to be described) and if it is determined that activation is not possible, a method is preferably used in which an error report is made immediately and a debugging program is activated on another execution unit.

To eliminate the necessity for separately designating an execution unit for activation, a configuration is preferably adopted in which: reference is made to the memory areas relating to the execution unit that is an object of debugging and that differs from the execution unit in which a debugging program is activated, a debugging program is activated for analyzing an execution unit that is the object of debugging or for analyzing the state of programs that are operating on that execution unit, and a debugging program is activated on the execution unit that is the source of distribution of activation instructions. In this case, of the functions of the activation instruction distribution unit, the need for a function of transferring activation instructions to another execution unit can be eliminated.

Explanation next regards the effects of the debugging system of the present exemplary embodiment.

In the present exemplary embodiment, a configuration is adopted in which stalled execution unit avoidance units 66 and 76 prevent the transmission of activation instructions to execution units in which a debugging program cannot be executed, and as a result, even when an execution unit stalls due to a fault and the operation of the execution unit is affected, as long as there is an execution unit that can be used, a debugging program can be activated on that execution unit.

(Fifth Exemplary Embodiment)

Explanation next regards the fifth exemplary embodiment of the present invention.

In the above-described first to fourth exemplary embodiments, a debugging program was able to refer only to memory areas relating to the execution units that were activated. However, the state of programs operating on an execution unit that is the object of debugging can in some cases be analyzed by referring to the way memory areas are being used.

The debugging system of the present exemplary embodiment is of a configuration that allows the task of debugging to be carried out by referring to memory areas of an execution unit that is the object of debugging from the execution unit in which the debugging program is activated.

Figure 13:
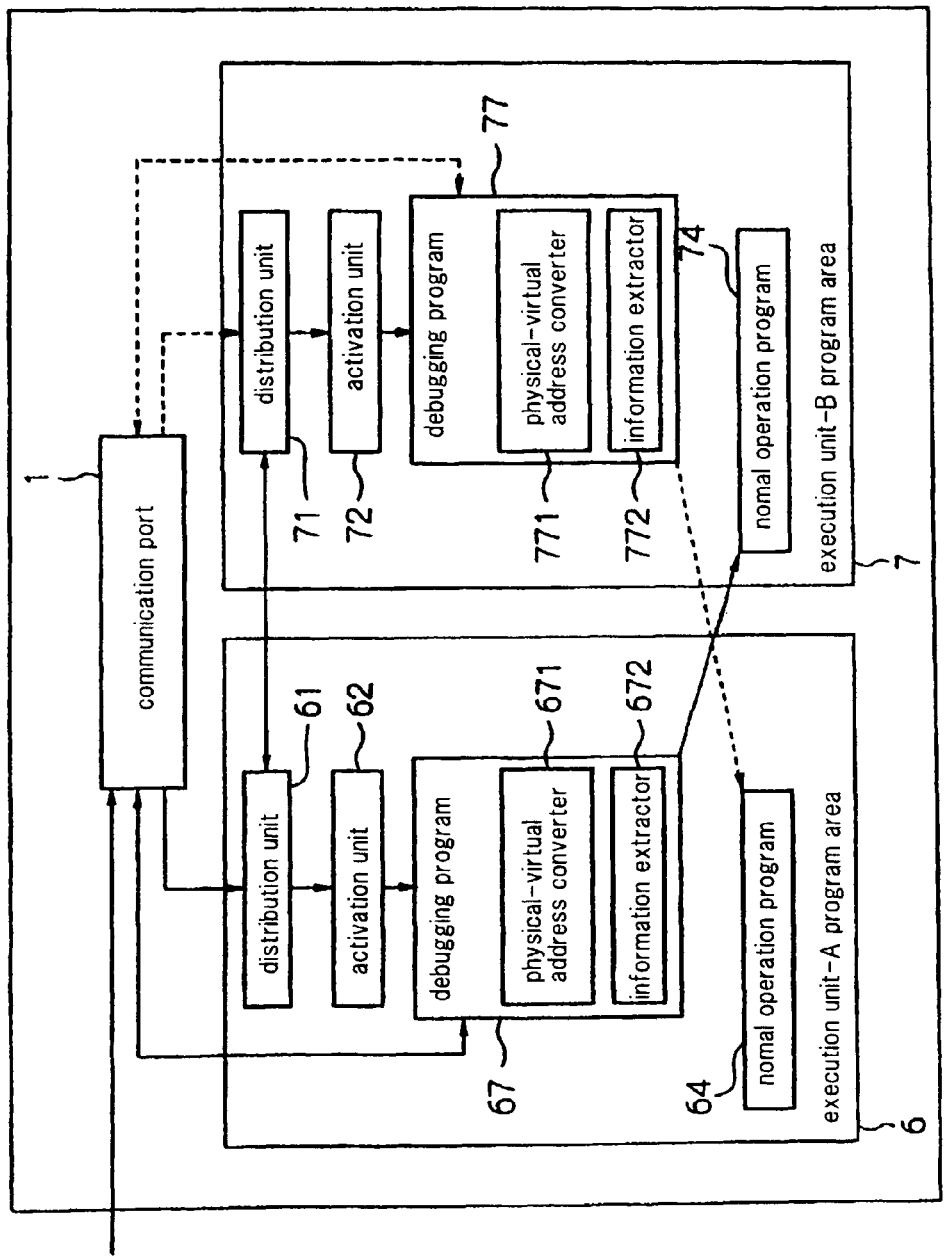
FIG. 13 is a block diagram showing the configuration of the debugging system of the fifth exemplary embodiment of the present invention.

As shown in FIG. 13, the debugging system of the present exemplary embodiment is of a configuration in which, compared to the configuration in the first exemplary embodiment shown in FIG. 5, debugging programs 63 and 73 are replaced by debugging programs 67 and 77, respectively.

Debugging program 67 is provided with physical-virtual address converter 671 and information extractor 672 for analyzing states.

Physical-virtual address converter 671 converts virtual addresses to physical addresses.

Information extractor 672 uses the physical addresses that have been converted by physical-virtual address converter 671 and takes into consideration the structure by which the OS (operating system) arranges control information in memory to extract necessary information from memory areas that are being used by normal operation program 74.

Debugging program 77 is similarly provided with physical-virtual address converter 771 and information extractor 772.

The following explanation regards an example of operation in which a debugging program is activated on execution unit A, but the operation is the same when debugging program 77 is activated on execution unit B.

Physical-virtual address converter 671 carries out: a first physical-virtual address conversion operation in which the offset (differential) information of the virtual address and physical address is adjusted to perform mutual conversion of virtual addresses and physical addresses; and a second physical-virtual address conversion operation in which the information of a physical/virtual conversion table is analyzed to place virtual addresses and physical addresses in a correspondence relationship.

Explanation first regards the first physical-virtual address conversion operation.

The first physical-virtual address conversion operation is an operation for dealing with areas that save physical addresses that are continuous over broad ranges (hereinbelow referred to as "continuous areas") such as areas which the kernel of the OS saves statically.

In a continuous area, when the physical address that corresponds to a particular virtual address is known, the differential between the virtual address and the physical address can be found. In a continuous area, when a virtual address is increased by n units, the corresponding physical address also increases by n units. As a result, saving the differential between a virtual address and a physical address and then adjusting this differential enables conversion from a virtual address to a physical address and conversion from a physical address to a virtual address.

Although a value obtained by separate calculation can be used as the differential of a virtual address and a physical address, in some OS, the virtual address that corresponds to the start of a continuous area is predetermined. In such a case, the differential can be calculated based on the physical address information at the start of memory areas that are assigned to each CPU. A configuration is preferable in which the physical address information at the start of memory areas that are assigned to each CPU can be acquired, and in which the differential can be calculated automatically.

Figure 14:
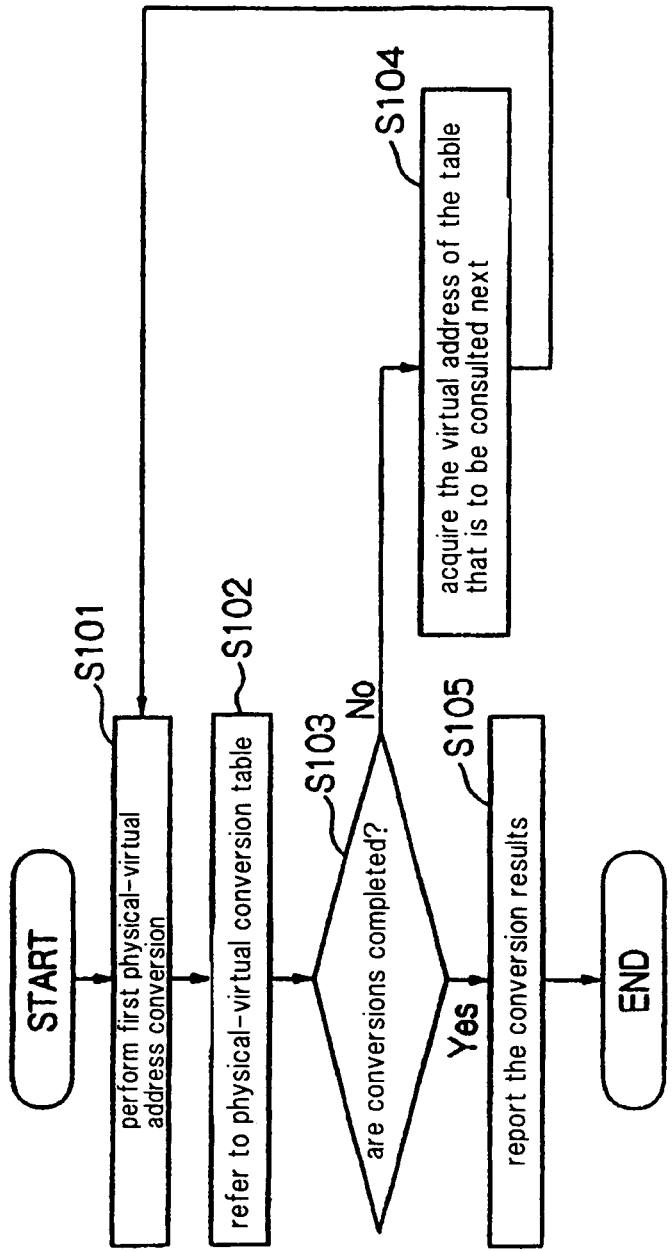
FIG. 14 is a flow chart for explaining the second physical-virtual address conversion operation of the physical-virtual address converter shown in FIG. 13.

Explanation next regards the second physical-virtual address conversion operation with reference to FIG. 14.

The second physical-virtual address conversion operation is a method used in a high-function OS, and is an operation for dealing with a method of using a physical-virtual address table to control virtual addresses of, for example, a user program. In a user program, memory areas that correspond to continuous virtual addresses are not necessarily continuous and physical addresses cannot be uniquely determined by means of a differential, and therefore require a plurality of procedures.

In the second physical-virtual address conversion operation, the first physical-virtual address conversion operation is used to acquire the physical address of a physical-virtual address conversion table that is held by the OS (Step S101).

This physical address is used to refer to the physical-virtual address conversion table and to acquire the content of the physical-virtual address conversion table (Step S102).

In a high-functional OS, the physical/virtual conversion table may be provided on a plurality of layers, and a conversion is not necessarily completed by making a single reference. Thus, when the conversion is not completed ("NO" in Step S103), the virtual address of the physical/virtual conversion table that is to be referred to next is acquired from the content of the physical/virtual conversion table (Step S104).

When these processes are repeated and the target physical address obtained ("YES" in Step S103), the obtained physical address is reported (Step S105), and the second physical-virtual address conversion operation is completed.

Figure 15:
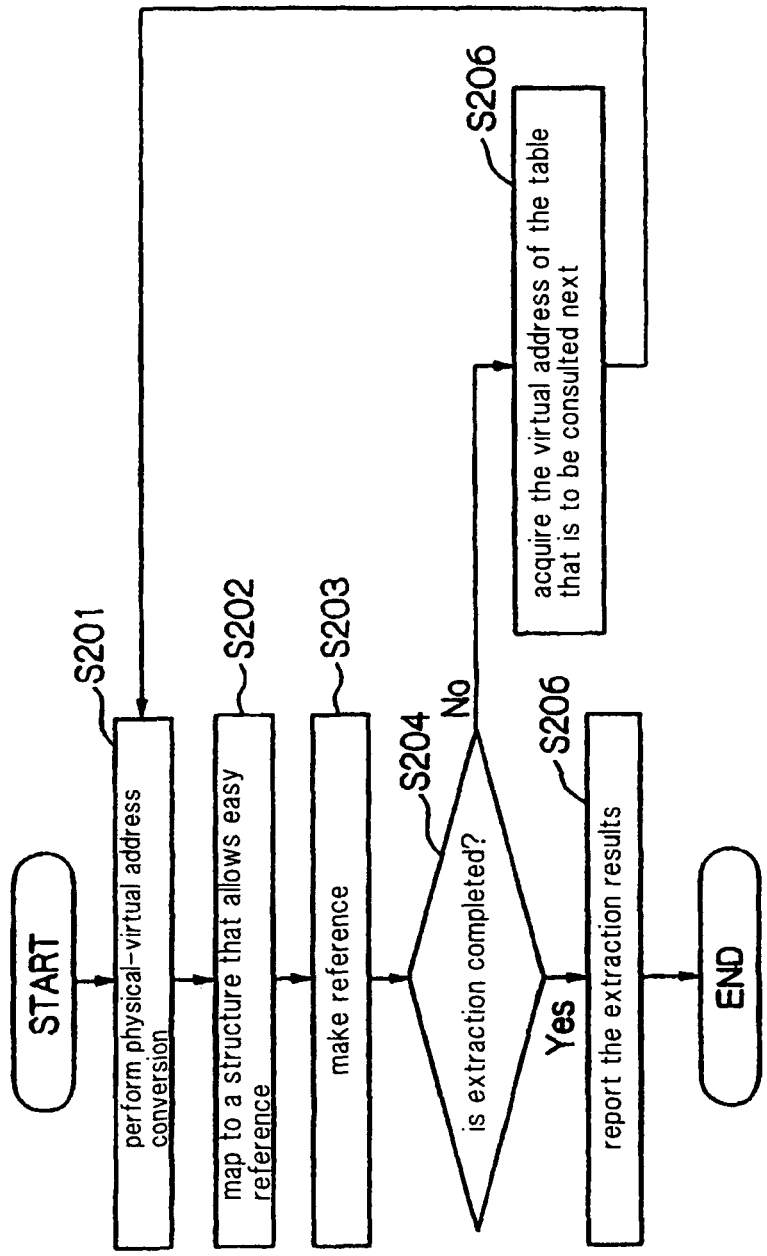
FIG. 15 is a flow chart for explaining the operation of the information extractor shown in FIG. 13.

Explanation next regards the operation of information extractor 672 with reference to FIG. 15.

Physical-virtual address conversion is carried out based on a virtual address having a data structure that serves as base point (Step S201) and the physical address, at which the referenced data exist, is obtained.

When physical addresses that allow direct reference to data can be mapped, a configuration is adopted in which necessary data can be easily accessed by a method of, for example, mapping the variables of structures having structures that are similar or identical to the data that are to be referred to onto the relevant physical addresses (Step S202) and then referring to the data (Step S203).

Alternatively, variables having structures that are similar or identical to the data to be referenced may be prepared in advance and the acquired physical address then used to copy the data to be referenced into areas of the prepared variables and then referring to the these data. Although this form allows data to be referred to even when physical addresses do not permit direct reference to data, it entails the drawback of requiring an overhead for copying.

When the data structure is simple, extraction is completed by these processes ("YES" in Step S204) and the extraction results are reported (Step S206), whereby the process is completed. Depending on the data, however, data of, for example, a list structure, may be arranged in a dispersed state.

When necessary data are absent or only partially available in the initial reference ("NO" in Step S204), the address indicating the next list location is obtained (Step S205). Because this address is recorded by a virtual address, the physical address is obtained by carrying out a physical-virtual address conversion (Step S201), and the content of the next list is consulted (Step S202 and Step S203). This process is repeated a plurality of times until the necessary data are complete.

In the present exemplary embodiment, in OS that do not use virtual addresses, there is no need for the physical-virtual address conversion of Step S201, and similar functions can be realized by processes that exclude this process.

Further, although explanation has regarded an example of a system provided with two execution units A and B in the present exemplary embodiment, the present exemplary embodiment can easily be extended to systems provided with any number, such as three or more, of execution units.

In the present exemplary embodiment, a debugging program is provided for analyzing the state of the debugging target execution unit or a program that operates in that execution unit by referring to the memory areas relating to the execution unit that is the object of debugging and that differs from the execution unit in which a debugging program is activated. As a result, the task of debugging can be carried out regardless of the state of the execution unit that is the target of debugging.

On the other hand, resources such as registers or cache memory provided in an execution unit cannot be checked by merely referring to the memory areas used by the execution unit. The potential therefore arises for the occurrence of problems such as the inability to obtain necessary debugging information due to the inability to refer to the content of a register, or the inability to check the latest information by merely referring to memory areas because the latest information continues to remain in cache memory.

As a result, in the present exemplary embodiment, an in-unit resource control unit (not shown) for reading from, writing to, and controlling registers or cache memory provided in the execution unit may be formed by the debugging program on the execution unit that is the object of debugging. This in-unit resource control unit is made up from a register content read/write unit (not shown) and a cache memory control unit (not shown).

When reading the content of a register, a read instruction is applied to the debugging program on the execution unit that is the object of debugging, reading is carried out by the register content read/write unit, and the results then reported. When carrying out writing, a write instruction and write data are applied to the debugging program on the execution unit that is the object of debugging, and writing is then carried out by the register content read/write unit.

Upon accepting an instruction to discharge the cache content, the cache memory control unit implements control such that the cache memory discharge command is executed by the execution unit. When the discharge of cache memory has been completed, the latest information is written to memory. As a result, the debugging program that acquires the information is able to observe the memory areas in other execution units. Alternatively, the debugging program on the execution unit that is the object of debugging can be of a configuration that reports the content of the read cache memory to the outside. Alternatively, a configuration is desirable that allows control of the operating mode of the cache memory or control of updating of the content.

During execution of a debugging program on the execution unit that is the object of debugging, of the registers that are provided in that execution unit, the content of registers used in operations or of registers relating to the progress of a program such as program counters is saved in the stack areas of the memory areas. However, there is a possibility that the content of these stack areas remains in the cache memory and that the latest values are not saved in the memory areas. As a result, the use of the above-described cache memory control unit enables a configuration in which the content of the saved registers is obtained by either discharging the content of the cache memory to the memory areas or by directly reading the content of the cache memory, thereby enabling acquisition of the register content that was saved during the execution of the program that is the object of debugging.

By adopting this type of configuration, when a debugging program can be used in the execution unit that is the object of debugging, a debugging program can be used that is provided with a register content read/write unit and cache memory control unit on the execution unit that is the object of debugging, and the memory areas can be referenced. As a result, the debugging program that obtains information is able to realize reading, writing, and control of registers or cache memory that cannot normally be executed.

(Sixth Exemplary Embodiment)

Explanation next regards the debugging system of the sixth exemplary embodiment of the present invention.

In the above-described first to fifth exemplary embodiments, the input of activation instructions from an outside control terminal was necessary when some type of fault occurred in an execution unit.

The debugging system of the present exemplary embodiment is of a configuration in which activation instructions are generated automatically when some type of fault occurs in an execution unit even when activation instructions are not applied as input from an outside control terminal.

Figure 16:
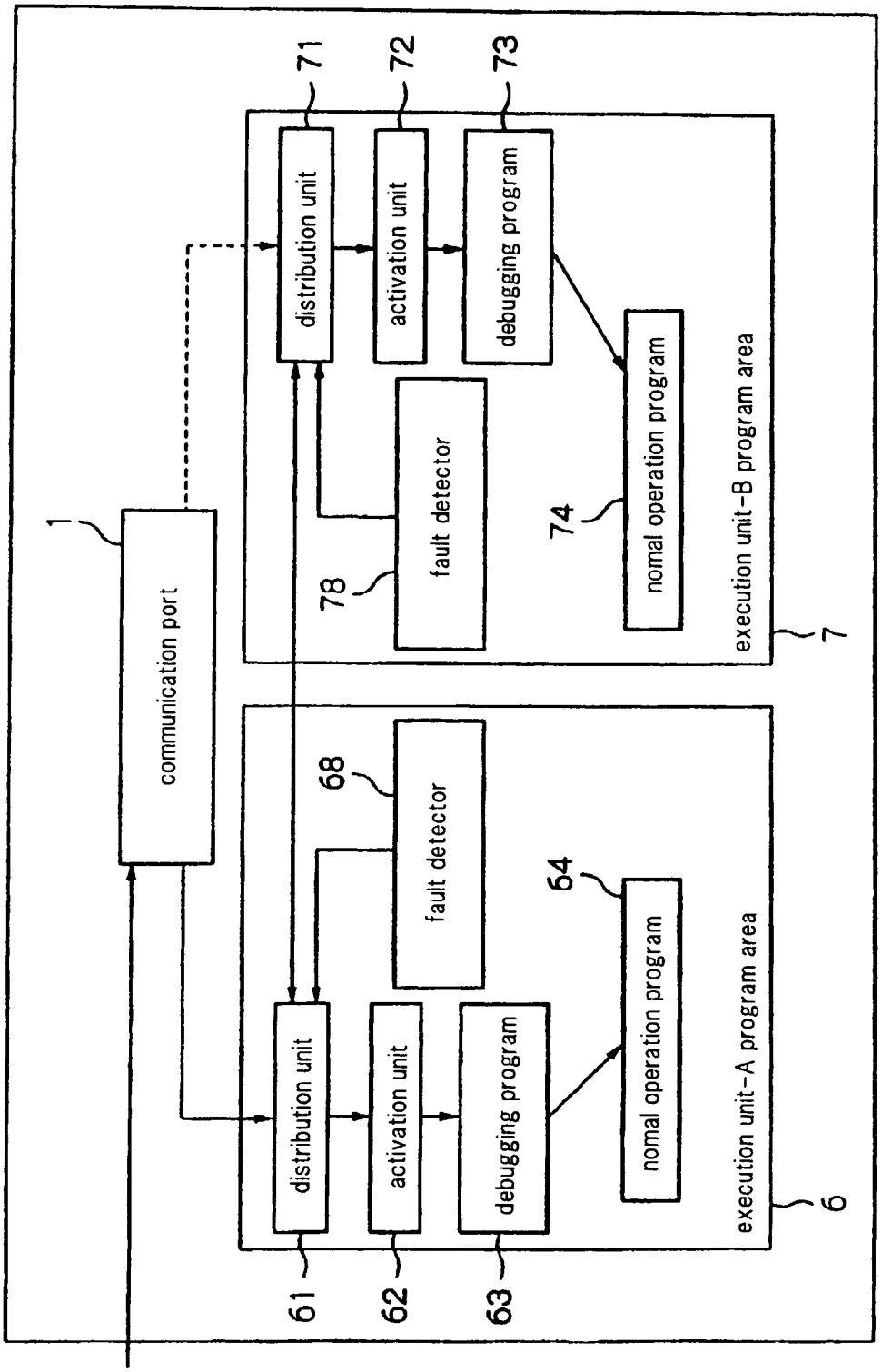
FIG. 16 is a block diagram showing the configuration of the debugging system of the sixth exemplary embodiment of the present invention.

As shown in FIG. 16, the debugging system of the present exemplary embodiment is of a configuration in which, compared to the configuration in the debugging system of the first exemplary embodiment shown in FIG. 5, fault detectors 68 and 78 have been added for detecting the occurrence of faults.

Fault detectors 68 and 78 generate debugging program activation instructions upon detecting the occurrence of faults in execution units A and B.

In this case, the system may be of a configuration such that the detection of a fault by fault detectors 68 and 78 is only reported to an outside control terminal. However, a configuration is preferably adopted that is provided with a means for halting, at the time of detection of a fault occurrence, the execution unit or program in which the fault occurred, the execution unit or program that was the cause of the occurrence of the fault, or other execution units or programs.

Execution units that are provided with fault detectors 68 and 78 need not necessarily coincide with execution units that are provided with debugging program activation units 62 and 72, and fault detectors 68 and 78 may be provided in only one of execution units A and B.

The overall operation in the present exemplary embodiment is identical to that of any of the above-described exemplary embodiments with the exception that a step of detecting a fault by means of fault detectors 68 and 78 is added before the step of receiving debugging program activation instructions.

Explanation next regards the configuration and operation of fault detectors 68 and 78.

Faults include faults whose occurrence is reported by the system (hereinbelow referred to as "errors during execution")

and faults that hinder the normal operation and are not reported by the system. Errors during execution include improper memory reference, improper command execution, and hardware exceptions. Faults that hinder normal operation include stalls caused by infinite loops and runaways.

Explanation first regards a first configuration of fault detectors 68 and 78 that targets errors during execution. In this case, fault detectors 68 and 78 are each made up from: a fault receiver (not shown) for receiving the report of a fault by the system, and a notification unit (not shown) for reporting the occurrence of a fault. In a system that is of a configuration such that a specific program is executed upon the occurrence of an error during execution, the fault detectors may be provided in the specific program.

When a fault detector is provided as a program on an execution unit to target errors during execution, a fault is detected by the fault detector of the execution unit in which an error during execution occurred. In this case, the execution unit that activates a debugging program may be made the execution unit in which the fault occurred and the activation instruction then generated. On the other hand, when a debugging program is activated in the execution unit in which the error occurred during execution, the possibility arises that the effect upon the execution unit or the memory areas brought about by the activation of the program will prevent the determination of the cause of the fault. In such cases, a configuration is preferably adopted in which the debugging program activation instruction is issued to another execution unit and debugging programs 67 and 77 in the fifth exemplary embodiment are activated.

Explanation next regards a second configuration of fault detectors 68 and 78 that target faults that hinder normal operation. In this case, fault detectors 68 and 78 are made up from: an update information read unit (not shown) for reading information that has been updated by the program that is executed on the execution unit that is the object of debugging, a normal update checking unit (not shown) for checking whether the information update is being carried out correctly, and a fault occurrence notification unit (not shown) for reporting the occurrence of faults.

Figure 17:
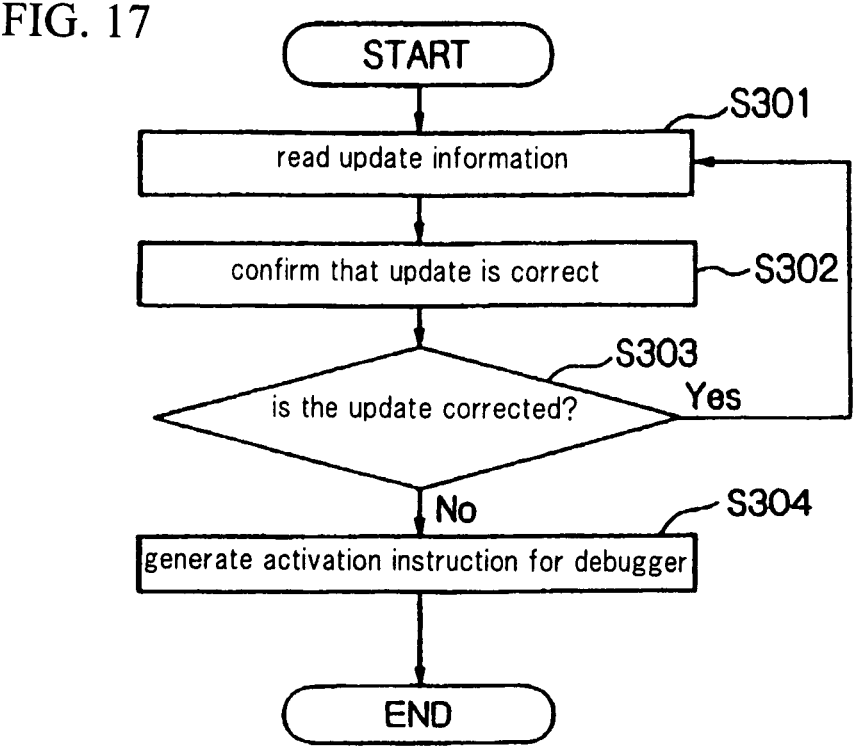
FIG. 17 is a flow chart for explaining the operation of the second configuration of the fault detector shown in FIG. 16.

Explanation next regards the operation of the second configuration of fault detectors 68 and 78 with reference to FIG. 17. Explanation here regards an example in which the fault occurrence notification unit is provided as a debugging program activation instruction generator for generating a debugging program activation instruction after checking the occurrence of a fault.

The update information read unit first reads information that has been updated by the program that is being executed on another execution unit (Step S301). Based on this information, the normal update checking unit checks whether the update is being carried out correctly (Step S302). If the update is being carried out correctly ("YES" in Step S303), normal update checking unit checks the next update. If it is detected that the update is abnormal due to the occurrence of a fault ("NO" in Step S303), the debugging program activation instruction generator generates a debugging program activation instruction (Step S304) and applies the activation instruction to the debugging program activation unit. The information that is updated by a program may be acquired by providing a program for updating information. However, by using time information that is used inside the system by the OS as the information that is updated by the program, the fault detector can also be realized without providing a separate program.

Explanation next regards a third configuration of fault detectors 68 and 78 that targets faults that hinder normal operation. In this case, fault detectors 68 and 78 are each of a configuration provided with: an interruption generator (not shown) for generating an interruption of the execution unit that is the object of debugging, a response checking unit (not shown) for checking responses from the execution unit that is the object of debugging, and an activation instruction generator (not shown) for generating debugging program activation instructions. In addition, the execution unit that is the object of debugging is further provided with a response unit for responding to interruptions.

Figure 18:
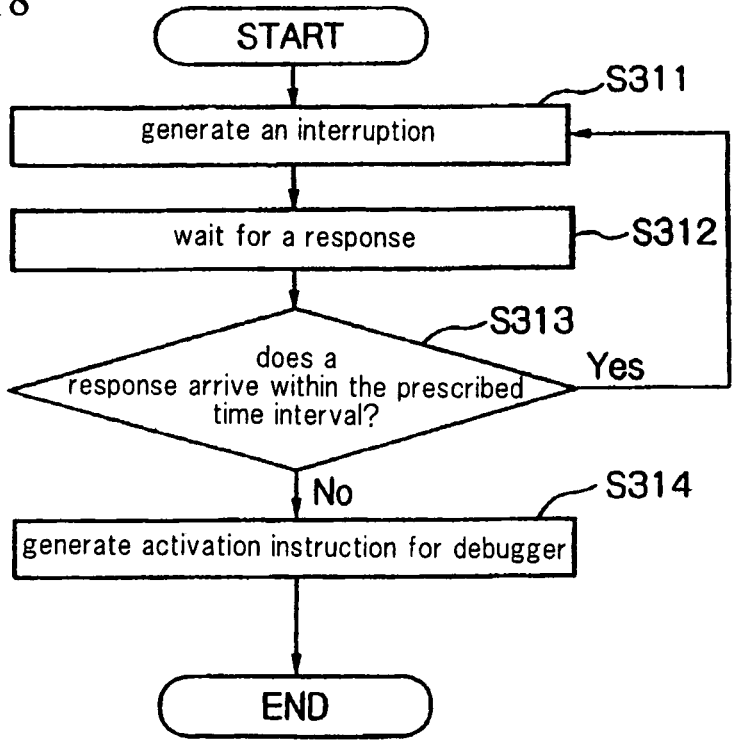
FIG. 18 is a flow chart for explaining the operation of the third configuration of the fault detector shown in FIG. 16.

Explanation next regards the operation of the third configuration of the fault detector with reference to FIG. 18.

The interruption generator first generates an interruption to other execution units (Step S311), and then waits for a response to return (Step S312). When a response is received within a prescribed time interval ("YES" in Step S313), operations are determined to be normal, and the next interruption is generated. If a response is not returned within the prescribed time interval ("NO" in Step S313), it is determined that a response was not possible due to a fault, and the activation instruction generator generates a debugging program activation instruction (Step S314) and applies the activation instruction to the debugging program activation unit. Although explanation here regards a case in which the determination standard is the return of a response within a prescribed time interval, the determination standard can also depend on whether the returned response is normal or abnormal.

Explanation next regards a fourth configuration of fault detectors 68 and 78 for targeting faults that hinder normal operation. This configuration can be realized by adding a means for investigating which execution unit is currently selected in stalled execution unit avoidance units (stalled execution unit avoidance units 66 and 76 of FIG. 11) that avoid execution units that have stalled to select execution units that can activate a debugging program.

Figure 19:
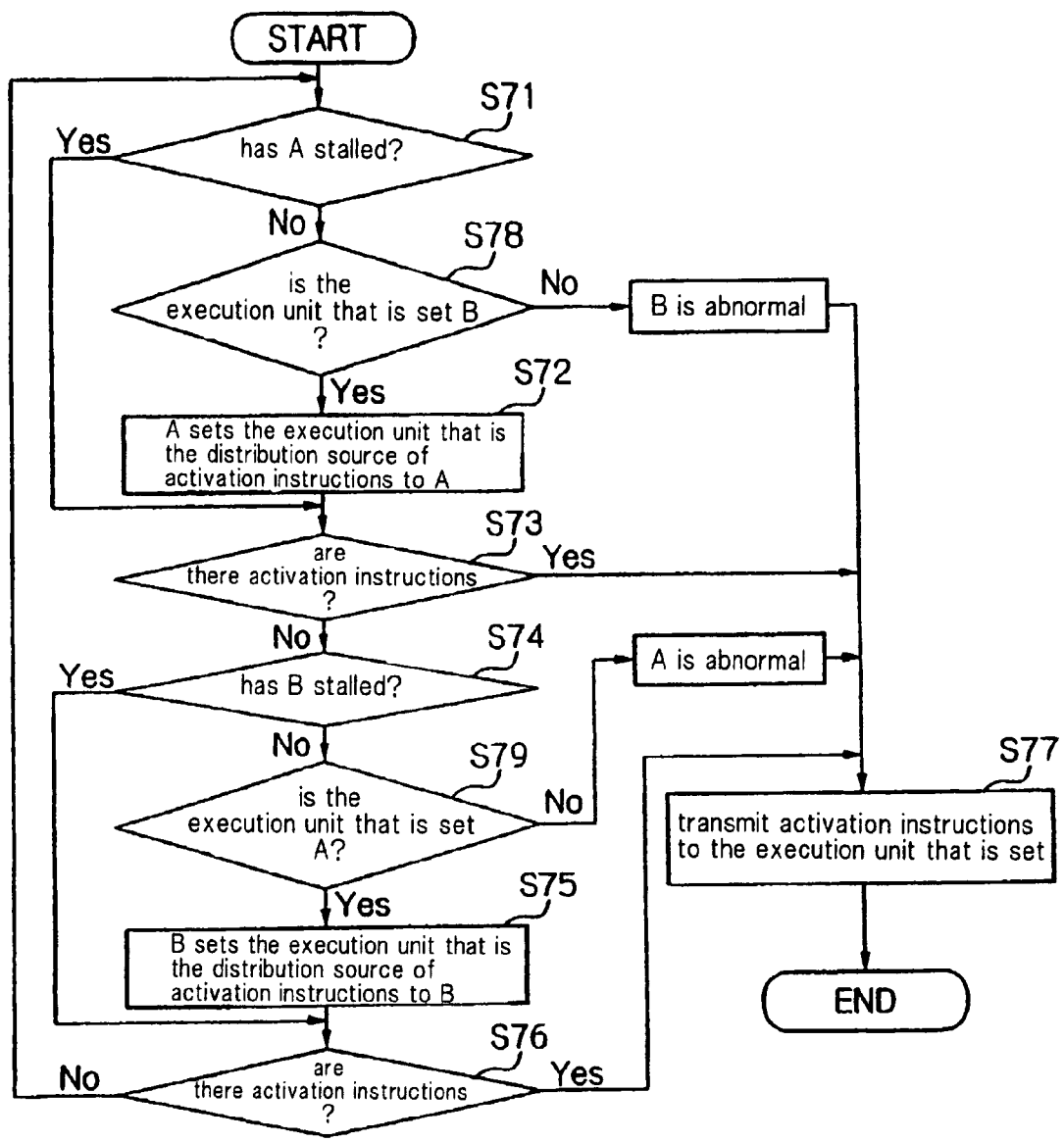
FIG. 19 is a flow chart for explaining the operation of the fourth configuration of the fault detector shown in FIG. 16.

Explanation next regards the operation of the fourth configuration of fault detectors 68 and 78 with reference to FIG. 19.

In the fourth configuration of fault detectors 68 and 78, as in FIG. 19, Steps S78 and S79 for determining which execution unit is currently set by stalled execution unit avoidance units 66 and 76 are added in addition to the operation of stalled execution unit avoidance units 66 and 76 in FIG. 12.

In FIG. 19, Step S71 and Step S74 are not intentional selections, but rather, are processes of inevitable selections according to the states at these times. In other words, Step S72 is a process executed by execution unit A, and programs are not executed when execution unit A is stalled. As a result, the branch of Step S71 shows that processing has advanced to Step S73 without carrying out the process of Step S72. Similarly, Step S75 is a process executed by execution unit B, and programs are not executed when execution unit B has stalled. As a result, the branch of Step S74 shows that processing has advanced to Step S76 without carrying out the process of Step S75. In this case, explanation assumes that the initial value of the execution unit that is the distribution source of debugging program activation instructions is execution unit B.

When execution unit A is not stalled ("NO" in Step S71), the initial set value is execution unit B ("YES" in Step S78), and the program on execution unit A therefore changes the execution unit that is the distribution source of debugging program activation instructions to execution unit A (Step S72). On the other hand, when execution unit A is stalled ("YES" in Step S71), processing advances to Step S73 without carrying out the process of Step S72. If there is no activation instruction here ("NO" in Step S73), processing advances to the investigation of Step S79 if execution unit B is not stalled ("NO" in Step S74). In Step S79, the execution unit that is set as the distribution source of activation instructions is investigated. This investigation is normal if the set execution unit is A ("YES" in Step S79). If the set execution unit is not execution unit A ("NO" in Step S79), the failure to execute Step S72 is indicated, and a fault on execution unit A can thus be detected. In this case, processing advances to Step S77 and an activation instruction is transmitted to the execution unit that is set (in this case, execution unit B) and the debugging program activated. If execution unit B is stalled in this case ("YES" in Step S74), a fault is similarly detected in Step S78 ("NO" in Step S78), and the debugging program is activated.

The above-described first to fourth configurations of the fault detectors are not mutually exclusive and can be combined in any way.

Explanation next regards the effects of the debugging system of the present exemplary embodiment.

In the present exemplary embodiment, a configuration was adopted that is provided with fault detectors 68 and 78 and that can check for the occurrence of faults, whereby, even in a system in which checking for the occurrence of faults is problematic, a debugging program can be activated and the task of debugging started following verification of the occurrence of a fault.

Further, in the present exemplary embodiment, a configuration can be adopted in which a means is provided for, upon detecting the occurrence of a fault, stopping an execution unit or program in which a fault has occurred, stopping an execution unit or program that is the cause of the occurrence of a fault, or stopping another execution unit or program. Adopting a configuration of this type enables the avoidance of situations in which the progression of processing following the occurrence of a fault impedes investigation of the cause of the occurrence of the fault.

Further, in the present exemplary embodiment, fault detectors 68 and 78 can be provided for generating debugging program activation instructions upon detecting the occurrence of faults. The adoption of a configuration of this type allows the task of debugging to begin without requiring a debugging technician to determine the execution unit in which a debugging program is to be activated or the type of debugging program and then activate the debugging program.

(Seventh Exemplary Embodiment)

Explanation next regards the debugging system of the seventh exemplary embodiment of the present invention.

According to the above-described debugging system of the fifth exemplary embodiment, the content of memory relating to a particular execution unit can be read even when the execution unit has stalled. However, the content of registers or cache memory of an execution unit that has entered a stalled state cannot be read even by the debugging system of the fifth exemplary embodiment. This inability results from the fact that the content of registers or cache memory typically cannot be read when an execution unit enters a stalled state.

The debugging system of the present exemplary embodiment is of a configuration that, when a particular execution unit has stalled, allows the content of registers and cache memory of that execution unit to be read to carry out debugging.

Figure 20:
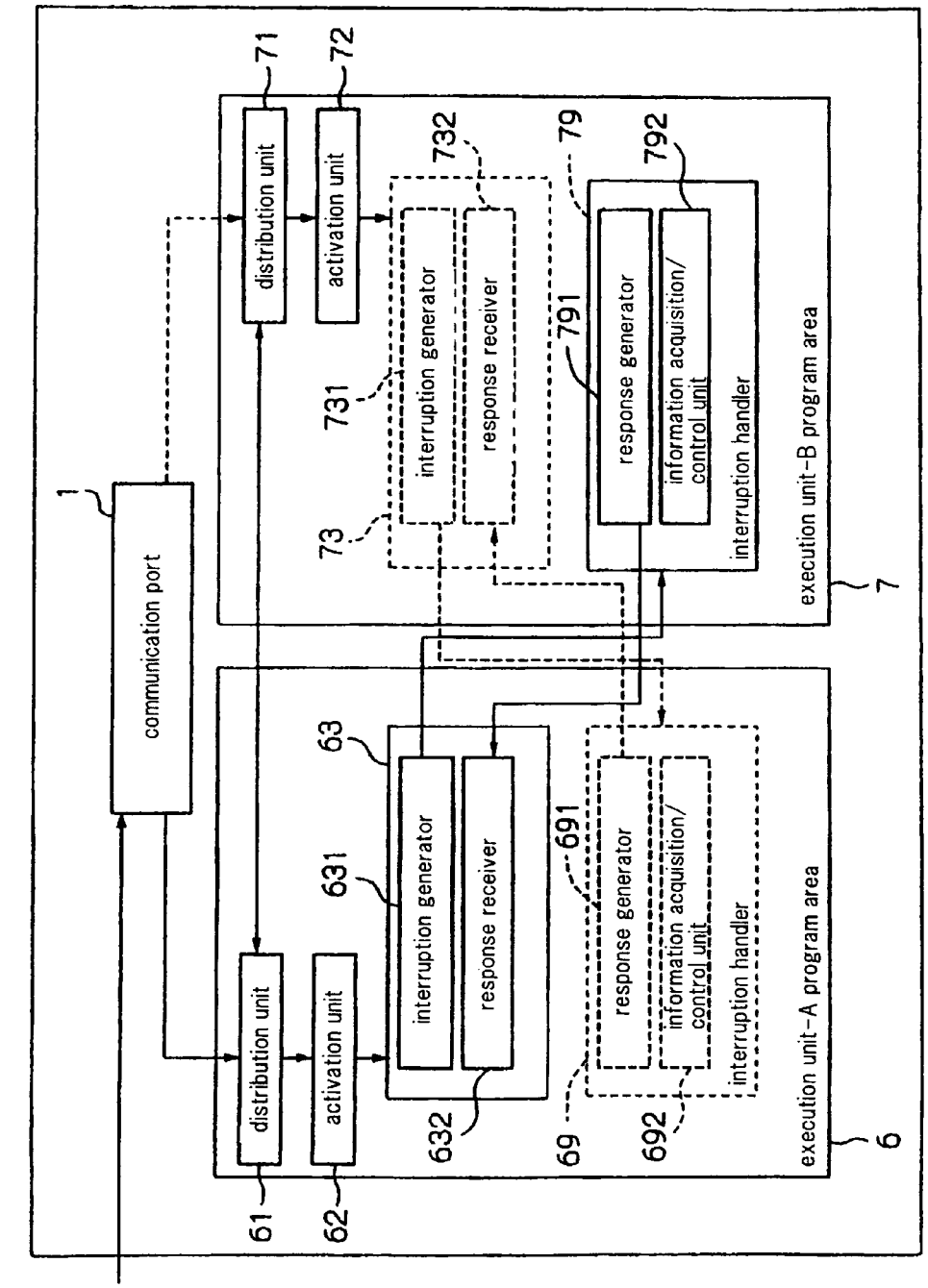
FIG. 20 is a block diagram showing the configuration of the debugging system of the seventh exemplary embodiment of the present invention.

As shown in FIG. 20, the debugging system of the present exemplary embodiment is of a configuration in which, compared to the configuration in the above-described first exemplary embodiment, debugging program 63 in execution unit-A program area 6 is provided with inter-execution unit interruption generator (represented as "interruption genera-tor" in FIG. 20) 631 and response receiver 632, and further, interruption handler 69 that is executed in the execution unit that is the target of debugging is provided with response generator 691 and information acquisition/control unit 692.

Inter-execution unit interruption generator 631 generates an interruption to execution unit B that is the object of debugging. Response receiver 632 receives the response from execution unit B that is the object of debugging by way of response generator 791.

When the interruption has been generated from another execution unit B, information acquisition/control unit 692 acquires information in the memory area that has been set in advance such as registers, cache memory, and flash memory. Response generator 691 transmits the information that has been obtained by information acquisition/control unit 692 to execution unit B that is caused to generate an interruption.

In the first exemplary embodiment shown in FIG. 5, interruption handler 69 was not shown, but an interruption handler is a program provided as a standard in a typical execution unit.

In addition, the debugging system of the present exemplary embodiment is of a configuration in which debugging program 73 in execution unit-B program area 7 is similarly provided with inter-execution unit interruption generator 731 and response receiver 732, and interruption handler 79 that is executed in execution unit that is the object of debugging is provided with response generator 791 and information acquisition/control unit 792.

Although FIG. 20 shows an example in which the debugging system of the present exemplary embodiment is applied to the configuration of the first exemplary embodiment, the debugging system can be similarly applied to the second to sixth exemplary embodiments.

Figure 21:
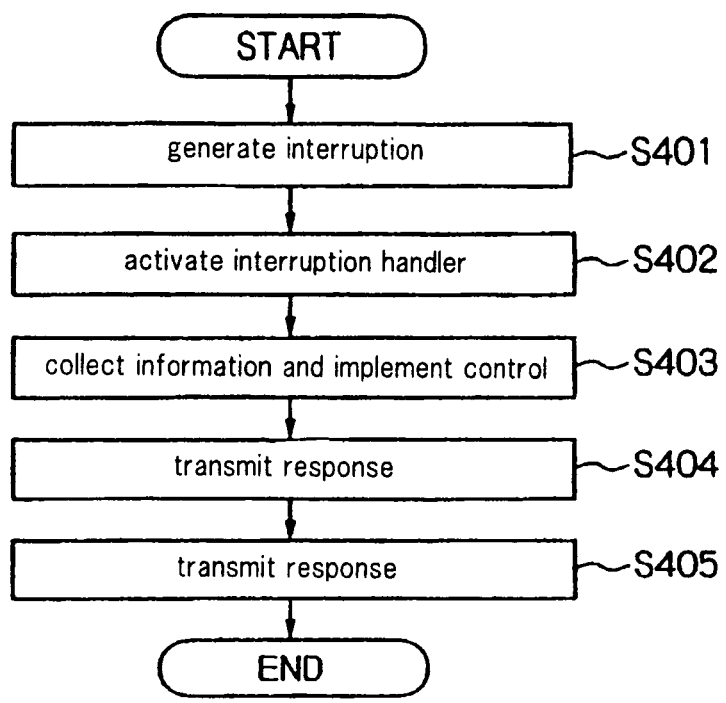
FIG. 21 is a flow chart for explaining the operation of the debugging system shown in FIG. 20.

Explanation next regards the operation of the debugging system of the present exemplary embodiment with reference to the flow chart of FIG. 21. Explanation here regards an example in which debugging of the execution unit-B side is carried out from debugging program 63 of execution unit A.

Debugging program 63 first issues an inter-execution unit interruption to execution unit B that is the object (Step S401), whereupon interruption handler 79 of execution unit B is activated (Step S402). In this interruption handler 79, information acquisition/control unit 792 is used to carry out information collection, writing, and control with the registers, cache memory, and flash memory of execution unit B as objects (Step S403). Response generator 791 then generates a response to execution unit A (Step S404), and execution unit A uses response receiver 632 to receive this response (Step S405). When the content of these operations is only control, only information regarding the result of control need be contained in the response. On the other hand, when the content of the operation includes information collection, the response also contains the collected information.

In addition, a configuration may be adopted in which interruption handler 79 is an interruption handler of timer interruptions that are periodically generated on the execution unit-B side, and in which execution unit A uses a communication unit (not shown) to apply to execution unit B instructions for carrying out execution control of target processes. However, such a configuration gives rise to the limitation that the timing for carrying out execution control is only the timing of the periodically generated timer interruptions.

In the present exemplary embodiment, operation for a case in which debugging of the execution unit-A side is carried out from debugging program 73 of execution unit B can be realized by the same scheme.

Although explanation here regards an example of a system provided with two execution units A and B in the present exemplary embodiment, the application can be easily extended to a system provided with any number, such as three or more, of execution units.

Explanation next regards the effects of the debugging system of the present exemplary embodiment.

In the present exemplary embodiment, debugging programs 63 and 73 are provided with inter-execution unit interruption generators 631 and 731 and response receivers 632 and 732; and interruption handlers that are executed in the execution units that are the objects of debugging are provided with information acquisition/control units 692 and 792 and response generators 691 and 791. The execution units that are the objects of debugging are then subjected to interruptions that are then generated from debugging programs that operate on execution units other than the execution units that are the objects of debugging, and information collection and control is carried out by the interruption handlers.

As described in the foregoing explanation, the interruption handlers are programs that are activated first for processing interruptions when these interruptions are generated. As a result, the provision of information acquisition/control units 692 and 792 and response generators 691 and 791 in interruption handlers 69 and 79 of execution units A and B, respectively, enables reading of the content of cache memory or registers of execution units that have entered a stalled state even when execution units A and B have stalled.

(Eighth Exemplary Embodiment)

Explanation next regards the debugging system of the eighth exemplary embodiment of the present invention.

The above-described first to seventh exemplary embodiments are systems in which debugging of a particular execution unit was carried out when the execution unit entered a stalled state.

A case can be considered in which, when an execution unit enters a stalled state, a particular process that is being executed by the normal operation program experiences a runaway. When a particular process experiences runaway in this way, the overall execution unit enters a stalled state and stops functioning even when other processes are free of faults.

The debugging system of the present exemplary embodiment is of a configuration in which, even when a particular process experiences a runaway and the execution unit enters a stalled state, the process in which runaway occurred is halted and the fault rectified to return the execution unit that stalled to a normal state.

Figure 22:
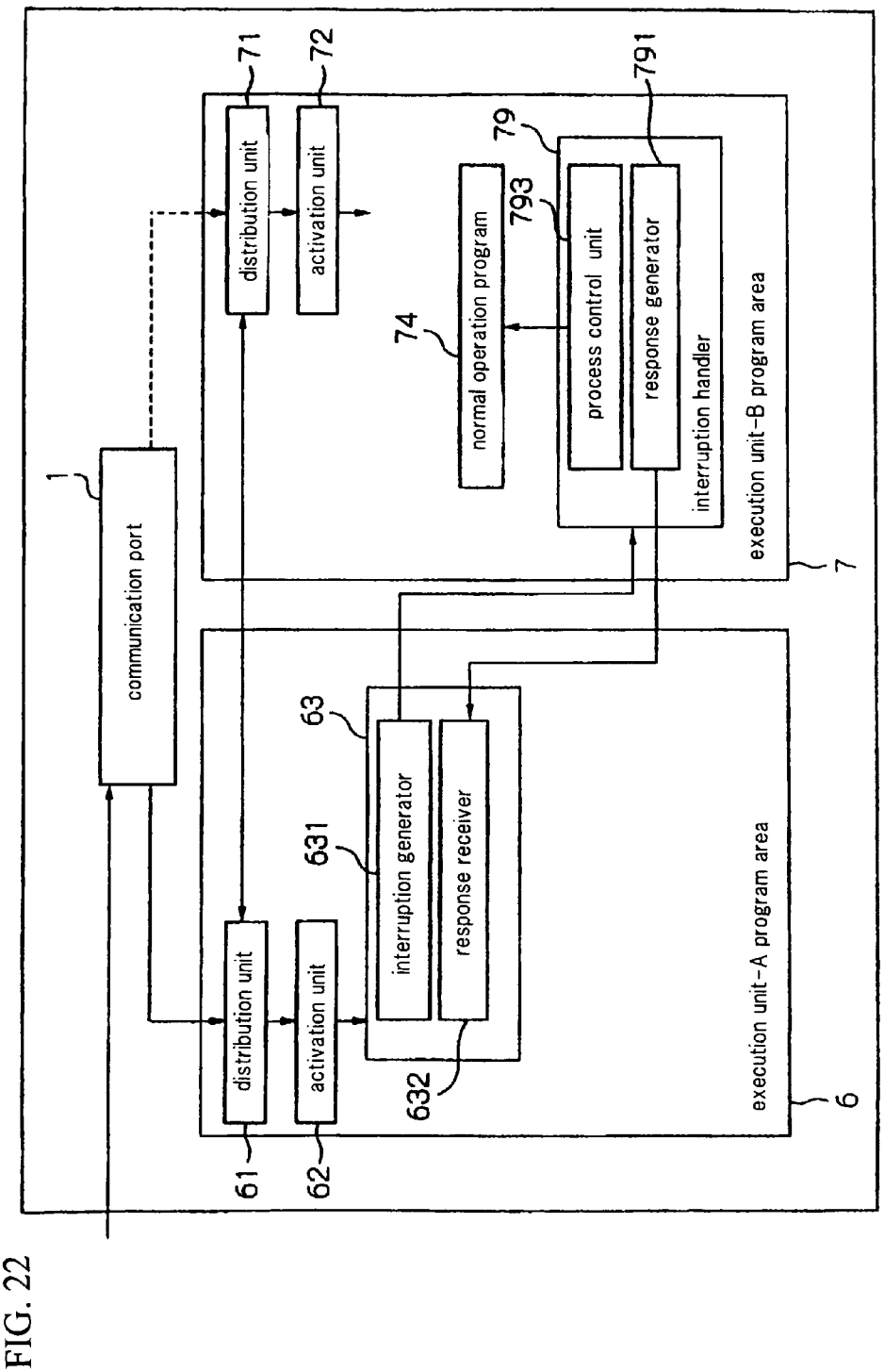
FIG. 22 is a block diagram showing the configuration of the debugging system of the eighth exemplary embodiment of the present invention.

FIG. 22 shows the configuration of the debugging system of the present exemplary embodiment. FIG. 22 shows a configuration in which, when execution unit B becomes the execution unit that is the target of debugging, debugging can be carried out only for execution unit B from execution unit A. When any execution unit is subjected to debugging from any other execution unit, the same configuration must be provided in each execution unit.

As shown in FIG. 22, the debugging system of the present exemplary embodiment is of a configuration in which, compared to the configuration in the debugging system of the first exemplary embodiment shown in FIG. 5, debugging program 63 is provided with inter-execution unit interruption generator (represented as "interruption generator" in FIG. 22) 631 and response receiver 632, and interruption handler 79 that is executed in execution unit B, which is the execution unit that is the object of debugging, is provided with response generator 791 and process control unit 793.

Inter-execution unit interruption generator 631 generates interruptions to execution unit B that is the object of debugging. Response receiver 632 receives responses from execution unit B that is the object of debugging by way of response generator 791.

Process control unit 793 implements control of processes of normal operation program 74 that is activated in execution unit B that is the object of debugging and halts a process that has experienced runaway. Response generator 791 transmits information that has been obtained as a result of the process control by process control unit 793 to execution unit B to which an interruption has been generated.

Figure 23:
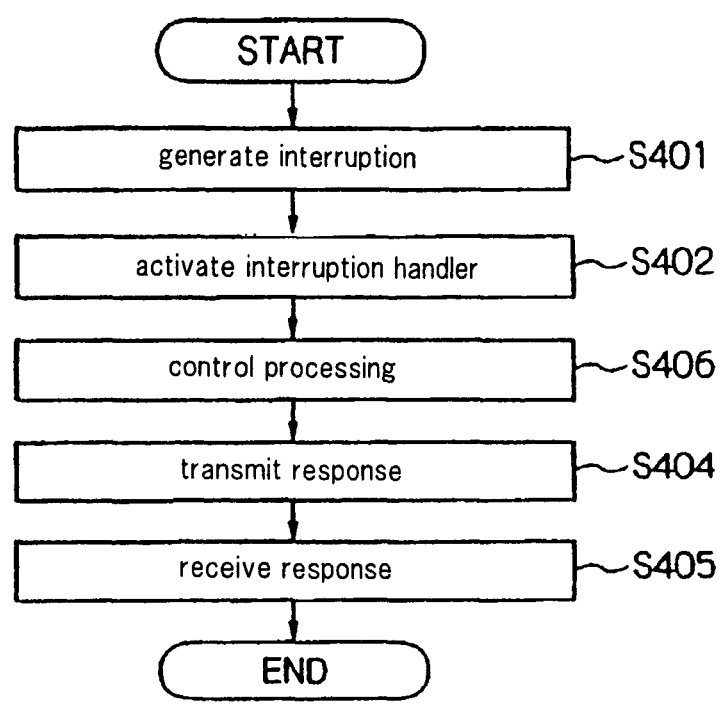
FIG. 23 is a flow chart for explaining the operation of the debugging system shown in FIG. 22.

Explanation next regards the operation of the debugging system of the present exemplary embodiment with reference to the flow chart of FIG. 23. FIG. 23 shows an example in which process control on the execution unit-B side is carried out from debugging program 63 of execution unit A.

Debugging program 63 first issues an inter-execution unit interruption to execution unit B that is the object of debugging (Step S401), whereupon interruption handler 79 of execution unit B is activated (Step S402). In this interruption handler 79, process control unit 793 is used to implement process control of normal operation program 74 that is being executed in execution unit B (Step S406). A response is then generated by response generator 791 and transmitted to execution unit A (Step S404), and execution unit A uses response receiver 632 to receive the response (Step S405).

In addition, a configuration may be adopted in which the interruption handler of timer interruptions that are periodically generated on the execution unit-B side is taken as interruption handler 79, and execution unit A uses a communication unit (not shown) to give execution unit B instructions for carrying out control of the execution of target processes. In the case of this configuration, however, the timing of the implemented execution controls is limited to only the timing of the periodically generated timing interruptions.

The following methods are specific methods for realizing the control of processing in processes that are the target of control.

In the first process control method, the scheduler of the OS is provided with a process control alteration unit for altering the process control implemented by the scheduler based on instructions from the outside. The process control can then be realized by the transmission of a process alteration instruction from process control unit 793 in interruption handler 79 to the process control alteration unit.

In the second process control method, a process control signal issue unit is provided for issuing process control signals to the process that is the target of control from process control unit 793 in interruption handler 79 by a procedure that resembles the API (Application Program Interface) (such as a system call) of the OS. The method can then be realized by the issue of process control signals to the process that is the object of control by the process control signal issue unit.

In the third process control method, an address alteration unit is provided in interruption handler 79 for changing a return address to the process that is the target of control that is saved in a memory area to another address. This method can then be realized by changing a return address to an incorrect address and thus generating an incorrect address reference exception by the address alteration unit in interruption handler 79.

In this case, merely the process of generating an exception can cause the process to be terminated because the abnormal termination process caused by the exception is carried out by the OS. However, various types of process control can be carried out by adopting a configuration that brings about the implementation of control other than an abnormal termination process, such as causing termination of a process in an exception handler.

In the fourth process control method, a command alteration unit is provided in interruption handler 79 for altering commands, which exist at the return addresses to a process that is the object of control and that are saved in a memory area, to other commands. The method can be realized by replacing a command that exists at a return address with a debugging command or an incorrect command and generating an exception by the command alteration unit in interruption handler 79. Merely the process of generating an exception can cause a process to be terminated because the OS carries out an abnormal termination process that is caused by an exception. However, various process controls can be implemented by adopting a configuration for causing control to be carried out other than an abnormal termination process, such as causing a termination of a process in an exception handler.

Already existing methods exist for issuing system calls for process control from a debugging program that is provided as a user process and for carrying out process control. When this type of method is used and any process being executed on the execution unit experiences a runaway, control does not shift to a debugging program with the result that process control cannot be implemented. However, when any of the above-described process controls that carry out process control from inside interruption handler 79 is used, process control can be carried out even when there is a process that has experienced a runaway because interruption handler 79 is executed with higher priority than the user process.

In the present exemplary embodiment, operation for a case in which debugging on the execution unit-A side is carried out from the debugging program of execution unit B can be realized by the same scheme.

Although explanation has been offered regarding an example of a system provided with two execution units A and B in the present exemplary embodiment, the present invention can be easily extended to a system provided with any number, such as three or more, of execution units.

Explanation next regards the effects of the debugging system of the present exemplary embodiment.

In the present exemplary embodiment, a configuration is adopted in which process control unit 793 is provided in interruption handler 79 that is executed by execution unit B that is the object of debugging, and control of the process that is the object of debugging is carried out from within interruption handler 79. An interruption is then generated to execution unit B that is the object of debugging from debugging program 63 that operates on execution unit A that is not execution unit B that is the object of debugging and process control is implemented in interruption handler 79, whereby process control can be carried out from execution unit A apart from execution unit B that is the object of debugging. In addition, because process control is carried out from within interruption handler 79 that is executed with higher priority than a user process, even when a process exists that has experienced a runaway, the process that experienced the runaway can be halted, the state in which the fault occurred can be analyzed to carry out processes such as correction of variable content, and further, the program can be executed again to observe whether the fault has been resolved or not. By repeating these processes, the execution unit that stalled can finally be returned to correct operation.

Potential For Utilization In Industry

The present invention can be applied for the purpose of a debugging system for use in system LSI provided with a plurality of execution units. The present invention can also be applied for the purpose of a debugging system for use in a built-in system provided with a plurality of execution units and can be applied to a computer system provided with a plurality of execution units.

The invention claimed is:

1. A debugging system of carrying out debugging of a program that is executed in a system in which a first execution unit and a second execution unit perform a linked operation, the debugging system including:
    a first activation instruction distribution unit that is provided in said first execution unit and that, upon receiving activation instructions instructing the activation of a debugging program to said first execution unit or activation instructions instructing the activation of a debugging program to said second execution unit, distributes said activation instructions to said first execution unit or said second execution unit;
    a second activation instruction distribution unit that is provided in said second execution unit and that, upon receiving activation instructions instructing the activation of a debugging program to said first execution unit or activation instructions instructing the activation of a debugging program to said second execution unit, distributes said activation instructions to said first execution unit or said second execution unit;
    a first debugging program activation unit that is provided in said first execution unit and that activates said debugging programs on said first execution unit based on said activation instructions;
    a second debugging program activation unit that is provided in said second execution unit and that activates said debugging programs on said first execution unit based on said activation instructions;
    a first communication unit that, upon receiving said activation instructions, transmits said activation instructions to said first execution unit or said second execution unit;
    a first avoidance unit that is provided in said first execution unit and that instructs said first communication unit to transmit said activation instructions to said first execution unit when said first execution unit is not in a stalled state;
    a second avoidance unit that is provided in said second execution unit and that instructs said first communication unit to transmit said activation instructions to said second execution unit when said second execution unit is not in a stalled state; and
    a stalled execution unit avoidance unit configured to prevent the transmission of said activation instructions to the debugging program activation unit that corresponds to an execution unit that is in a stalled state, wherein
        said first avoidance unit performs a first avoidance process that instructs said first communication unit to transmit said activation instructions to said first execution unit when said first execution unit is not in a stalled state,
        said second avoidance unit performs a second avoidance process that instructs said first communication unit to transmit said activation instructions to said second execution unit when said second execution unit is not in a stalled state, and
        said first avoidance process and said second avoidance process are alternately repeated;
        wherein first and second execution units are processors.

2. The debugging system according to claim 1, further comprising
    a first fault detection unit that is provided in said first execution unit and that generates activation instructions instructing the activation of a debugging program when the destination of said first communication unit is not said second execution unit, and a second fault detection unit that is provided in said second execution unit and that generates activation instructions instructing the activation of a debugging program when the destination of said first communication unit is not said first execution unit.

3. The debugging system according to claim 1,
wherein said first activation instruction distribution unit and said second activation instruction distribution unit:
distribute said activation instructions to said first execution unit when said activation instructions instruct the activation of said debugging program to said first execution unit, and
distribute said activation instructions to said second execution unit when said activation instructions instruct the activation of said debugging program to said second execution unit.

4. The debugging system according to claim 1,
wherein said first activation instruction distribution unit and said second activation instruction distribution unit distribute said activation instructions to said first execution unit or said second execution unit that is determined based on the operating state of said first execution unit and said second execution unit.

5. The debugging system according to claim 1,
wherein said first activation instruction distribution unit and said second activation instruction distribution unit distribute said activation instructions to said first execution unit or said second execution unit based on the vacant capacity of storage areas of said first execution unit and said second execution unit.

6. The debugging system according to claim 1,
wherein said first activation instruction distribution unit and said second activation instruction distribution unit distribute said activation instructions to a third execution unit based on whether or not a linked operation is performed with said first execution unit and said second execution unit.

7. The debugging system according to claim 1,
wherein said first activation instruction distribution unit and said second activation instruction distribution unit distribute said activation instructions to a fourth execution unit in which the program, that is the object of debugging, is activated or to a fifth execution unit that performs linked operation with said fourth execution unit.

8. The debugging system according to claim 1, further comprising:
a first relay unit that is provided in said first execution unit and that, upon receiving commands to a debugging program in said first execution unit from said first communication unit, transmits said commands to a debugging program in said first execution unit and that, upon receiving commands to a debugging program in said second execution unit from said first communication unit, transmits said commands to a debugging program in said second execution unit; and
a second relay unit that is provided in said second execution unit and that, upon receiving commands to a debugging program in said first execution unit from said first communication unit, transmits said commands to a debugging program in said first execution unit and that, upon receiving commands to a debugging program in said second execution unit from said first communication unit, transmits said commands to a debugging program in said second execution unit.

9. The debugging system according to claim 1,
wherein a debugging program includes an information extraction unit that refers memory areas that are being used by a normal operation program that is activated on said second execution unit when a debugging program is activated on said first execution unit and that refers memory areas that are being used by the normal operation program that is activated on said first execution unit when a debugging program is activated on said second execution unit.

10. The debugging system according to claim 1, wherein a debugging program includes:
a first inter-execution unit interruption generation unit that causes a first interruption to occur in said second execution unit when a debugging program is activated on said first execution unit and that causes a second interruption to occur in said first execution unit when a debugging program is activated on said second execution unit; and
a first response reception unit that receives a response from said first execution unit or said second execution unit,
wherein said first execution unit acquires a first information in said first execution unit and transmits said first information to said first response reception unit when said second interruption occurs, and
said second execution unit acquires a second information in said second execution unit and transmits said second information to said first response reception unit when said first interruption occurs.

11. The debugging system according to claim 1, wherein a debugging program includes:
a second inter-execution unit interruption generation unit that causes a third interruption to occur in said second execution unit when a debugging program is activated on said first execution unit and that causes a fourth interruption to occur in said first execution unit when a debugging program is activated on said second execution unit; and
a second response reception unit that receives a response from said first execution unit or said second execution unit,
wherein said first execution unit implements control of processes of a first normal operation program that is activated on said first execution unit and transmits a first response to said second response reception unit when said fourth interruption occurs, and
said second execution unit implements control of processes of a second normal operation program that is activated on said second execution unit and transmits a second response to said second response reception unit when said third interruption occurs.

12. A debugging method of carrying out debugging of a program executed in a system in which a first execution unit and a second execution unit perform linked operation, said method comprising steps of:
by said first execution unit or said second execution unit, upon receiving activation instructions instructing the activation of a debugging program to said first execution unit or activation instructions instructing the activation of a debugging program to said second execution unit, distributing said activation instructions to said first execution unit or said second execution unit;
by a debugging program activation unit that is provided in said first execution unit or said second execution unit, activating debugging programs based on said activation instructions;

by a first communication unit, upon receiving said activation instructions, transmitting said activation instructions to said first execution unit or said second execution unit;

by a first avoidance unit that is provided in said first execution unit, instructing said first communication unit to transmit said activation instructions to said first execution unit when said first execution unit is not in a stalled state;

by a second avoidance unit that is provided in said second execution unit, instructing said first communication unit to transmit said activation instructions to said second execution unit when said second execution unit is not in a stalled state, by a stalled execution unit avoidance unit, preventing the transmission of said activation instructions to the debugging program activation unit that corresponds to an execution unit that is in a stalled state, by said first avoidance unit, performing a first avoidance process that instructs said first communication unit to transmit said activation instructions to said first execution unit when said first execution unit is not in a stalled state, by said second avoidance unit, performing a second avoidance process that instructs said first communication unit to transmit said activation instructions to said second execution unit when said second execution unit is not in a stalled state, and said first avoidance process and said second avoidance process are alternately repeated.

* * * * *

UNITED STATES PATENT AND TRADEMARK OFFICE
CERTIFICATE OF CORRECTION

PATENT NO.       : 8,589,879 B2                                    Page 1 of 1
APPLICATION NO. : 11/921437
DATED            : November 19, 2013
INVENTOR(S)      : Suzuki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1414 days.

Signed and Sealed this
Twenty-second Day of September, 2015

Michelle K. Lee
*Director of the United States Patent and Trademark Office*